(12) United States Patent
Koshika et al.

(10) Patent No.: US 12,531,238 B2
(45) Date of Patent: Jan. 20, 2026

(54) NICKEL-MANGANESE COMPOSITE HYDROXIDE, METHOD FOR PRODUCING THE SAME, POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

(71) Applicant: SUMITOMO METAL MINING CO., LTD., Tokyo (JP)

(72) Inventors: Yuki Koshika, Niihama (JP); Haruki Kaneda, Niihama (JP); Takaaki Ando, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 16/344,888

(22) PCT Filed: Oct. 31, 2017

(86) PCT No.: PCT/JP2017/039255
§ 371 (c)(1),
(2) Date: Apr. 25, 2019

(87) PCT Pub. No.: WO2018/079809
PCT Pub. Date: May 3, 2018

(65) Prior Publication Data
US 2020/0052295 A1    Feb. 13, 2020

(30) Foreign Application Priority Data
Oct. 31, 2016   (JP) .................. 2016-213413

(51) Int. Cl.
*H01M 4/505*    (2010.01)
*C01G 53/50*    (2025.01)
(Continued)

(52) U.S. Cl.
CPC ............ *H01M 4/505* (2013.01); *C01G 53/50* (2013.01); *C01G 53/82* (2025.01); *H01M 4/366* (2013.01);
(Continued)

(58) Field of Classification Search
CPC ................. H01M 4/505; H01M 4/525; H01M 2004/021; H01M 2004/028; C01G 53/006; C01G 53/50
See application file for complete search history.

(56) References Cited

U.S. PATENT DOCUMENTS

2008/0160410 A1* 7/2008 Sun ..................... H01M 4/0471
                                              429/231.95
2009/0068561 A1  3/2009 Sun et al.
(Continued)

FOREIGN PATENT DOCUMENTS

CN   102631875 A   8/2012
CN   103098272 A   5/2013
(Continued)

OTHER PUBLICATIONS

JP-2012256435-A English machine translation (Year: 2022).*
(Continued)

*Primary Examiner* — Armindo Carvalho, Jr.
(74) *Attorney, Agent, or Firm* — WHDA, LLP

(57) ABSTRACT

A positive electrode active material reduces an eluted lithium amount when used for a nonaqueous electrolyte secondary battery, and a nickel-manganese composite hydroxide as a precursor. A nickel-manganese composite hydroxide contains a secondary particle formed of a plurality of mutually flocculated primary particles and is represented by Formula (1): $Ni_{x1}Mn_{y1}M_{z1}(OH)_{2+\alpha}$ ($0.70 \leq x1 \leq 0.95$, $0.05 \leq y1 \leq 0.30$, $x1+y1+z1=1.0$, and $0 \leq \alpha \leq 0.4$ are satisfied; and M is at least one element selected from Co, (Continued)

Al, Ti, V, Cr, Zr, Nb, Mo, Hf, Ta, Fe, and W). The nickel-manganese composite hydroxide has a manganese-rich layer from a particle surface to a particle inner part of the secondary particle. The manganese-rich layer is represented by Formula (2): $Ni_{x2}Mn_{y2}M_{z2}(OH)_{2+\alpha}$. The thickness of the manganese-rich layer is at least 5% and up to 20% of the radius of the secondary particle.

11 Claims, 5 Drawing Sheets

(51) Int. Cl.
    *C01G 53/82* (2025.01)
    *H01M 4/02* (2006.01)
    *H01M 4/36* (2006.01)
    *H01M 4/525* (2010.01)
(52) U.S. Cl.
    CPC ......... *H01M 4/525* (2013.01); *C01P 2006/11* (2013.01); *C01P 2006/40* (2013.01); *H01M 2004/021* (2013.01); *H01M 2004/028* (2013.01)

(56) References Cited

U.S. PATENT DOCUMENTS

| | | |
|---|---|---|
| 2010/0316910 A1 | 12/2010 | Kajiyama et al. |
| 2011/0076558 A1 | 3/2011 | Miyazaki et al. |
| 2013/0108926 A1 | 5/2013 | Kim et al. |
| 2013/0189581 A1* | 7/2013 | Imaizumi ............... H01M 4/131 429/223 |
| 2013/0202966 A1* | 8/2013 | Yu ........................ H01M 4/1391 429/223 |
| 2014/0175329 A1* | 6/2014 | De Palma ............. H01M 4/505 252/182.1 |
| 2015/0155548 A1 | 6/2015 | Ryoshi et al. |
| 2015/0188136 A1* | 7/2015 | Mori ..................... H01M 4/525 429/223 |
| 2015/0236378 A1* | 8/2015 | Kuwajima ........ H01M 10/0568 429/200 |
| 2015/0364761 A1* | 12/2015 | Fukui .................... H01M 4/505 429/223 |
| 2016/0093885 A1 | 3/2016 | Kamata et al. |
| 2017/0012288 A1* | 1/2017 | Yamaji .................. H01M 4/505 |
| 2017/0133668 A1* | 5/2017 | Kim ...................... H01M 4/505 |
| 2017/0263930 A1 | 9/2017 | Inoue et al. |
| 2018/0053933 A1 | 2/2018 | Ryoshi et al. |
| 2018/0108940 A1* | 4/2018 | Kwon .................... C01G 53/50 |
| 2018/0190983 A1 | 7/2018 | Fukui et al. |
| 2018/0254481 A2* | 9/2018 | Kamata .................. C01G 53/04 |
| 2019/0157660 A1* | 5/2019 | Jang ..................... H01M 4/1391 |
| 2020/0006770 A1 | 1/2020 | Kamata et al. |

FOREIGN PATENT DOCUMENTS

| | | | | |
|---|---|---|---|---|
| CN | 103797623 A | 5/2014 | | |
| CN | 104379509 A | 2/2015 | | |
| CN | 105122517 A | 12/2015 | | |
| EP | 2749537 A1 | 7/2014 | | |
| JP | 2009-525578 A | 7/2009 | | |
| JP | 2010-114088 A | 5/2010 | | |
| JP | 2011-076797 A | 4/2011 | | |
| JP | 2011-113885 A | 6/2011 | | |
| JP | 2012256435 A * | 12/2012 | | |
| JP | 5316726 B2 * | 10/2013 | ........ H01M 10/0525 | |
| JP | 2015-056368 A | 3/2015 | | |
| JP | 2016-033906 A | 3/2016 | | |
| WO | 2007/114557 A1 | 10/2007 | | |
| WO | 2011/087309 A2 | 7/2011 | | |
| WO | WO-2014181891 A1 * | 11/2014 | .......... H01M 10/052 | |
| WO | WO-2015115547 A1 * | 8/2015 | ............. C01G 53/00 | |

OTHER PUBLICATIONS

Extended (Supplementary) European Search Report dated Jun. 9, 2020, issued in counterpart EP Application No. 17863954.8. (6 pages).
International Search Report dated Jan. 30, 2018, issued in counterpart application No. PCT/JP2017/039255, with English translation. (16 pages).
Notification of Transmittal of Translation of the International Preliminary Report on Patentability (Form PCT/IB/338) issued in counterpart International application No. PCT/JP2017/039255 mailed May 9, 2019 with Forms PCT/IB/373 and PCT/ISA/237. (7 pages).
Office Action dated Jun. 23, 2021, issued in counterpart CN Application 201780081165.8, with English Translation. (22 pages).
Office Action dated Dec. 29, 2023, issued in counterpart CN Application No. 202210342965.3, with English translation. (13 pages).
Office Action dated Jan. 31, 2025, issued in counterpart EP Application No. 17863954.8. (5 pages).
Kim, Jeong-Min et al., "Synthesis and electrochemical performance of Li [Ni 0.7 Co 0.1 Mn 0.2] O2/C cathode materials", Nanotechnology Materials and Devices Conference (NMDC), 2011 IEEE, Oct. 18, 2011, pp. 495-496, Cited in EP Office Action dated Jan. 31, 2025. (2 pages).

* cited by examiner

NICKEL-MANGANESE COMPOSITE HYDROXIDE, METHOD FOR PRODUCING THE SAME, POSITIVE ELECTRODE ACTIVE MATERIAL FOR NONAQUEOUS ELECTROLYTE SECONDARY BATTERY, METHOD FOR PRODUCING THE SAME, AND NONAQUEOUS ELECTROLYTE SECONDARY BATTERY

TECHNICAL FIELD

The present invention relates to a nickel-manganese composite hydroxide, a method for producing the same, a positive electrode active material for a nonaqueous electrolyte secondary battery, a method for producing the same, and a nonaqueous electrolyte secondary battery.

BACKGROUND ART

In recent years, with the proliferation of portable electronic equipment such as cellular phones and notebook personal computers, development of a nonaqueous electrolyte secondary battery with reduced size and weight having high energy density is intensely demanded. A representative example of such a nonaqueous electrolyte secondary battery is a lithium ion secondary battery. For a negative electrode active material of the lithium ion secondary battery, lithium metal, lithium alloys, metal oxides, carbon, and the like are being used. These materials are materials that can de-insert and insert lithium.

Currently, research and development of lithium ion secondary batteries are being energetically conducted. Among them, lithium ion secondary batteries using lithium-transition metal composite oxides, especially a lithium-cobalt composite oxide ($LiCoO_2$), which is relatively easily synthesized, for a positive electrode active material can obtain as high voltage as 4 V class and are thus expected as batteries having high energy density and are in practical use. However, the lithium-cobalt composite oxide ($LiCoO_2$) uses a cobalt compound, which is rarely produced and is high in price, for a raw material, and causes a cost increase in batteries. Given these circumstances, it is being hoped that materials other than the lithium-cobalt composite oxide ($LiCoO_2$) are used as the positive electrode active material.

Recently, expectations have been growing that lithium-ion secondary batteries will be used as not only small-sized secondary batteries for portable electronic equipment but also large-sized secondary batteries for electric power storage and electric vehicles. Given these circumstances, reducing the costs of the active material to enable lithium-ion secondary batteries lower in price to be produced is expected to have major repercussions to wide fields. Examples of materials newly presented as the positive electrode active material for lithium-ion secondary batteries include a lithium-manganese composite oxide ($LiMn_2O_4$) using manganese, which is lower in price than cobalt, and a lithium-nickel composite oxide ($LiNiO_2$) using nickel.

This lithium-manganese composite oxide ($LiMn_2O_4$) is low in price in its raw materials and is excellent in thermal stability, especially safety about ignition or the like and is thus said to be a promising alternative material to the lithium-cobalt composite oxide ($LiCoO_2$), but is only about half the lithium-cobalt composite oxide ($LiCoO_2$) in theoretical capacity, and thus has a drawback in that it is difficult to meet a demand of higher capacity of lithium-ion secondary batteries that is growing year by year. The lithium-manganese composite oxide also has a drawback in that at 45° C. or higher self-discharge violently occurs, and charge/discharge life reduces.

The lithium-nickel composite oxide ($LiNiO_2$) has nearly the same theoretical capacity as that of the lithium-cobalt composite oxide ($LiCoO_2$) and shows a slightly lower battery voltage than that of the lithium-cobalt composite oxide. Given these circumstances, decomposition of an electrolyte solution through oxidation is less likely to be an issue, higher capacity is expected, and development thereof is being energetically conducted.

However, when the lithium-ion secondary battery is produced using the lithium-nickel composite oxide containing purely only nickel without replacing nickel with another element as the positive electrode active material, there is a drawback in that the positive electrode active material releases lithium ions more easily than other positive electrode materials to cause gelation when a paste for producing an electrode plate is prepared.

Various presentations have been made in order to resolve such drawbacks. Patent Literature 1 presents $LiNi_aCo_bMn_cO_2$ (where a+b+c=1, 0.3≤a≤0.6, 0.3≤b≤0.6, and 0.1≤c≤0.4) with a water-soluble alkali amount of up to 0.4% by mass as a lithium-nickel-cobalt-manganese composite oxide synthesized with a balanced composition ratio, for example.

Patent Literature 2 presents a method for producing a positive electrode active material for a lithium-ion battery including mixing a nickel-cobalt composite oxide, a lithium compound, and at least one compound selected from an aluminum compound, a zirconium compound, a bismuth compound, and an antimony compound and containing at least a bismuth compound with an average primary particle diameter of up to 1 μm together, firing the mixture, removing lithium hydroxide and lithium carbonate in an acidic aqueous solution, and again firing the mixture, for example.

Patent Literature 3 presents a positive electrode material for a nonaqueous electrolyte secondary battery obtained by mixing a metal composite hydroxide mainly containing nickel with its composition optimized and a lithium compound together, firing the mixture, and stirring the mixture with water, for example. It is said that by this method a positive electrode active material with high capacity, excellent cycle characteristics, and less eluted alkali component can be obtained.

CITATION LIST

Patent Literature

[Patent Literature 1] Japanese Unexamined Patent Application Publication No. 2011-076797
[Patent Literature 2] Japanese Unexamined Patent Application Publication No. 2011-113885
[Patent Literature 3] Japanese Unexamined Patent Application Publication No. 2015-056368

SUMMARY OF INVENTION

Technical Problem

However, the lithium-nickel-cobalt-manganese composite oxide of Patent Literature 1 is a material with a content of nickel, which bears an oxidation-reduction reaction of charging and discharging, of about 60% in the first place and is thus difficult to achieve high capacity. The positive electrode active material of Patent Literature 2 has a problem in that the process of pickling the fired product and then again firing it is complicated and costly and, in addition, the additional elements cause a reduction in capacity. The positive electrode material of Patent Literature 3 has a problem in that the addition of stirring with water and a drying process is costly, optimization of a water-washing condition is difficult, and the target capacity cannot be obtained under conditions other than the optimum condition.

In view of the above circumstances, an object of the present invention is to provide a positive electrode active material that has high capacity and high energy density and can also achieve a reduction in an eluted lithium amount when used for a nonaqueous electrolyte secondary battery and a nickel-manganese composite hydroxide as a precursor thereof. Another object thereof is to provide a method for producing a nickel-manganese composite hydroxide that enables easy production on an industrial scale and a method for producing a positive electrode active material for a nonaqueous electrolyte secondary battery using the nickel-manganese composite hydroxide.

Solution to Problem

A first aspect of the present invention provides a nickel-manganese composite hydroxide containing a secondary particle formed of a plurality of mutually flocculated primary particles and represented by General Formula (1): $Ni_{x1}Mn_{y1}M_{z1}(OH)_{2+\alpha}$ (in the formula (1), $0.70 \leq x1 \leq 0.95$, $0.05 \leq y1 \leq 0.30$, $x1+y1+z1=1.0$, and $0 \leq \alpha \leq 0.4$ are satisfied; and M is at least one element selected from Co, Al, Ti, V, Cr, Zr, Nb, Mo, Hf, Ta, Fe, and W), in which the nickel-manganese composite hydroxide has a manganese-rich layer from a particle surface to a particle inner part of the secondary particle, and in which the manganese-rich layer is represented by General Formula (2) below and the thickness of the manganese-rich layer is at least 5% and up to 20% of the radius of the secondary particle:

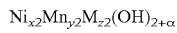
General Formula (2):

(in the formula (2), $x2+z2=0$ and $y2=1$ are satisfied or $y2/(x2+z2) \geq 0.6$ is satisfied; $0 \leq z2 \leq 0.40$, $x2+y2+z2=1.0$, and $0 \leq \alpha \leq 0.4$ are satisfied; and M is at least one element selected from Co, Al, Ti, V, Cr, Zr, Nb, Mo, Hf, Ta, Fe, and W).

The nickel-manganese composite hydroxide preferably has a volume average particle diameter (Mv) of at least 4 µm and up to 20 µm and [(D90−D10)/Mv] indicating a particle diameter variation index calculated from an accumulated 90 volume % diameter (D90), an accumulated 10 volume % diameter (D10), and the volume average particle diameter (Mv) of at least 0.60 in particle size distribution measured by laser diffraction scattering. The nickel-manganese composite hydroxide preferably has a tap density of at least 1.8 g/cm³ and up to 3.2 g/cm³.

A second aspect of the present invention provides a method for producing the nickel-manganese composite hydroxide, the method including a first crystallization process including generating particles of a nickel-manganese composite hydroxide by continuously supplying a first mixed aqueous solution containing at least a nickel salt and a manganese salt to a reaction aqueous solution to be subjected to neutralization crystallization and collecting the particles by overflowing slurry containing the particles from a reaction tank and a second crystallization process of forming the manganese-rich layer on surfaces of the particles by subjecting a reaction aqueous solution containing the collected particles and a second mixed aqueous solution having a molar ratio of Ni, Mn, and M similar to that in the manganese-rich layer to neutralization crystallization.

At the first crystallization process and the second crystallization process, the ammonia concentration of the reaction aqueous solution is preferably adjusted to at least 5 g/L and up to 25 g/L. At the first crystallization process and the second crystallization process, the temperature of the reaction aqueous solution is preferably adjusted to a range of at least 35° C. and up to 60° C. At the second crystallization process, the pH value measured with a liquid temperature of 25° C. as a basis of the reaction aqueous solution is preferably adjusted to a range of at least 10.0 and up to 13.0.

A third aspect of the present invention provides a positive electrode active material for a nonaqueous electrolyte secondary battery containing a lithium-nickel-manganese composite oxide containing a secondary particle formed of a plurality of mutually flocculated primary particles, represented by General Formula (3): $Li_{1+t}Ni_{x3}Mn_{y3}M_{z3}O_{2+\beta}$ (in the formula (3), $-0.05 \leq t \leq 0.5$, $0.70 \leq x3 \leq 0.95$, $0.05 \leq y3 \leq 0.30$, $x3+y3+z3=1.0$, and $0 \leq \beta \leq 0.5$ are satisfied; and M is at least one element selected from Co, Al, Ti, V, Cr, Zr, Nb, Mo, Hf, Ta, Fe, and W), and having a hexagonal layered structure, in which the positive electrode active material has a degree of circularity of the secondary particle calculated by image analysis of at least 0.95, a (003)-plane crystallite diameter by X-ray diffraction measurement of at least 160 nm and up to 300 nm, and a lithium amount eluted to water when immersed in water of up to 0.2% by mass relative to the entire positive electrode active material.

The positive electrode active material preferably has a volume average particle diameter (Mv) of at least 4 µm and up to 20 µm and [(D90−D10)/Mv] indicating a particle diameter variation index calculated from an accumulated 90 volume % diameter (D90), an accumulated 10 volume % diameter (D10), and the volume average particle diameter (Mv) of at least 0.60 in particle size distribution measured by laser diffraction scattering. The positive electrode active material preferably has a specific surface area of at least 0.20 m/g and up to 0.70 m²/g. The positive electrode active material preferably has a tap density of at least 2.2 g/cm³ and up to 3.6 g/cm³.

A fourth aspect of the present invention provides a method for producing a positive electrode active material for a nonaqueous electrolyte secondary battery containing a lithium-nickel-manganese composite oxide represented by General Formula (3): $Li_{1+t}N_{x3}Mn_{y3}M_{z3}O_{2+\beta}$ (in the formula (3), $-0.05 \leq t \leq 0.5$, $0.70 \leq x3 \leq 0.95$, $0.05 \leq y3 \leq 0.30$, $x3+y3+z3=1.0$, and $0 \leq \beta \leq 0.5$ are satisfied; and M is at least one element selected from Co, Al, Ti, V, Cr, Zr, Nb, Mo, Hf, Ta, Fe, and W) and having a hexagonal layered structure, the method including mixing the nickel-manganese composite hydroxide and a lithium compound together to form a lithium mixture and firing the lithium mixture in an oxidative atmosphere at a temperature of at least 800° C. and up to 950° C. to obtain a lithium-nickel-manganese composite oxide.

A value obtained by dividing an accumulated 50 volume % diameter (D50) of the lithium-nickel-manganese composite oxide after the firing by an accumulated 50 volume % diameter (D50) of the nickel-manganese composite hydroxide before the firing is preferably up to 1.2 in particle size distribution measured by laser diffraction scattering.

A fifth aspect of the present invention provides a non-aqueous electrolyte secondary battery including a positive electrode containing the positive electrode active material.

According to the present invention, a positive electrode active material that has high capacity and high energy density when used for a nonaqueous electrolyte secondary battery and inhibits gelation in paste preparation during production of an electrode plate and a nickel-manganese composite hydroxide as a precursor thereof can be obtained. The method of production of the present invention can easily produce the positive electrode active material and the nickel-manganese composite hydroxide as the precursor thereof on an industrial scale and is of extremely high industrial value.

DESCRIPTION OF EMBODIMENTS

Figure 1:
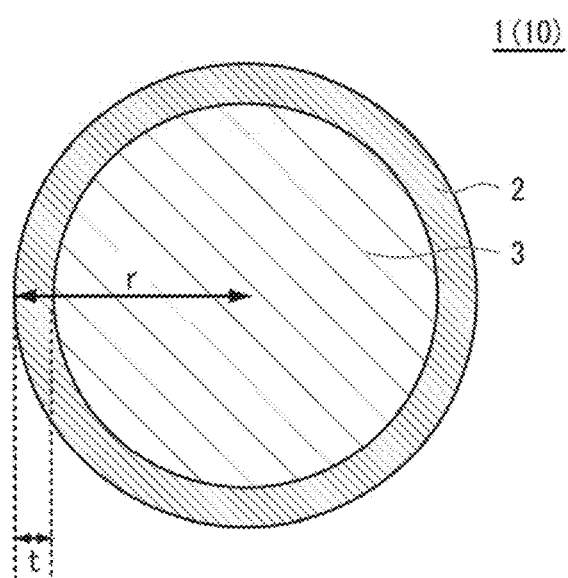
FIG. 1 is a schematic diagram of an exemplary nickel-manganese composite hydroxide of an embodiment.

The following describes details of a nickel-manganese composite hydroxide, a positive electrode active material for a nonaqueous electrolyte secondary battery, and methods for producing the same of the present embodiment with reference to the accompanying drawings as appropriate. In the drawings, to make components easier to understand, they are illustrated with a part emphasized or with a part simplified, and actual structures or shapes, a reduced scale, and the like may be different. In the specification, the description "A to B" means "at least A and up to B."

1. Nickel-Manganese Composite Hydroxide

FIG. 1 is a schematic diagram of an exemplary nickel-manganese composite hydroxide 10 (hereinafter, also referred to as a "composite hydroxide 10") according to the present embodiment. The composite hydroxide 10 contains a secondary particle 1 formed of a plurality of mutually flocculated primary particles and has a manganese-rich layer 2 from a particle surface to a particle inner part of the secondary particle. A central part 3 is placed inside the manganese-rich layer 2. The composite hydroxide 10 has a multilayer structure in which the composition of a secondary particle inner part (the central part 3) and the composition of an outer circumferential part (the manganese-rich layer 2) are different from each other, in which the composition of the outer circumferential part (the manganese-rich layer 2) is higher than the composition of the secondary particle inner part (the central part 3) in the ratio of Mn.

(Composition of Entire Nickel-Manganese Composite Hydroxide)

The composite hydroxide 10 is represented by General Formula (1): $Ni_{x1}Mn_{y1}M_{z1}(OH)_{2+\alpha}$ (M is at least one element selected from Co, Al, Ti, V, Cr, Zr, Nb, Mo, Hf, Ta, Fe, and W; and x1 satisfies $0.70 \leq x1 \leq 0.95$, y1 satisfies $0.05 \leq y1 \leq 0.30$, x1+y1+z1=1.0 is satisfied, and a satisfies $0 \leq \alpha \leq 0.4$). The formula (1) indicates the composition of the entire composite hydroxide 10.

In the formula (1), x indicating the content of nickel is at least 0.7 and up to 0.95. When the positive electrode active material is produced with the composite hydroxide 10 as a precursor (a raw material), the composition ratio (Ni:Mn:M) of the entire composite hydroxide 10 is maintained in the positive electrode active material to be obtained. When the positive electrode active material obtained with the composite hydroxide 10 having such a composition as a precursor is used for a secondary battery, high capacity can be achieved. The composition ratio of the composite hydroxide 10 is adjusted so as to be similar to a composition ratio required for the positive electrode active material to be obtained.

In the formula (1), z indicating the content of M is at least 0 and up to 0.25. When Co is contained as M, output characteristics and cycle characteristics are further improved. The Mn/Ni ratio of the entire composite hydroxide 10 is about at least 0.05 and up to 0.42 and, in view of obtaining high battery capacity, may be up to 0.35 or up to 0.3. In the formula (1), α is a coefficient that changes in accordance with the valence number of the metal elements contained in the composite hydroxide 10.

(Particle Structure of Nickel-Manganese Composite Hydroxide)

It is known that although a discharging capacity when a secondary battery is produced with a lithium-nickel-manganese composite oxide (hereinafter, also referred to as a "lithium composite oxide") as a positive electrode active material is higher and improves in performance when the content of Ni is higher (that is, Mn/Ni is higher), a higher content of Ni increases alkalinity, and gelation is likely to occur during preparation of a positive electrode mixture paste. In addition, as described in Patent Literature 3, it is said that lithium eluted from the positive electrode active material is a cause of gelation of the positive electrode mixture paste, and a lithium composite oxide having a high Ni content in particular requires a process of adjusting an eluted lithium amount in some cases. The eluted lithium amount refers to the amount of lithium capable of being eluted to water present in the lithium composite oxide and refers to the amount of excessive lithium derive from an unreacted lithium compound in the lithium composite oxide, excessive lithium in crystals of the lithium composite oxide, and the like.

By the way, the inventors of the present invention have newly focused on, in a process of producing the lithium composite oxide, i) the degree of sintering during firing relates to an Mn/Ni ratio: when the Mn/Ni ratio is low, the degree of sintering increases; when the Mn/Ni ratio is high, on the other hand, the degree of sintering reduces and ii) the eluted lithium amount relates to firing temperature: when the firing temperature is high, the eluted lithium amount decreases; when the firing temperature is low, on the other hand, the eluted lithium amount increases and have found out that a precursor having a structure in which the Mn/Ni ratio of the entire nickel-manganese composite hydroxide is low (that is, the content of Ni is high) and only its surface Mn/Ni ratio is high (that is, the content of Mn is high) is used as a precursor of the lithium-nickel-manganese composite oxide, and a firing condition of this precursor and a lithium compound is adjusted, whereby a positive electrode active material that has higher capacity and higher energy density and can inhibit gelation of the positive electrode mixture paste can be obtained to complete the present invention.

The composite hydroxide 10 of the present embodiment has a multilayer structure in which the composition of the central part 3 and the composition of the manganese-rich layer 2 as the outer circumferential part are different from each other and is adjusted such that the composition of the manganese-rich layer 2 is higher than the composition of the central part 3 in the content ratio of Mn/Ni. Consequently, the composite hydroxide 10 can provide a positive electrode active material that has higher capacity and higher energy density and can inhibit gelation of the positive electrode mixture paste by adjusting the firing temperature to reduce the eluted lithium amount and to reduce sintering to an appropriate extent. The firing temperature can be at least 800° C., for example. The composite hydroxide 10 is high in the ratio of Ni in the composition of the entire secondary particle as indicated by the formula (1), the positive electrode active material with the composite hydroxide 10 as the precursor can produce a secondary battery with high capacity.

The manganese-rich layer 2 is represented by General Formula (2) below:

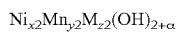
$$Ni_{x2}Mn_{y2}M_{z2}(OH)_{2+\alpha}$$ General Formula (2):

(in the formula (2), x2+z2=0 and y2=1 are satisfied or y2/(x2+z2)≥0.6 is satisfied; 0≤z2≤0.40, x2+y2+z2=1.0, and 0≤α≤0.4 are satisfied; and M is at least one element selected from Co, Al, Ti, V, Cr, Zr, Nb, Mo, Hf, Ta, Fe, and W).

The manganese-rich layer 2 may contain Mn singly as a metal, for example. In this case, in the formula (2), x2+z2=0 and y2=1 are satisfied, and the composition of the manganese-rich layer 2 is $Mn(OH)_{2+\alpha}$. The manganese-rich layer 2 may contain at least one of Ni and M as metals other than Mn. In this case, in the formula (2), y/(x+z)≥0.6 is satisfied, and the manganese-rich layer 2 contains Mn in at least 0.6 time the total (mol) of Ni and M.

When the manganese-rich layer 2 contains metals other than Mn, in the formula (2), x2 indicating the content of nickel is, in view of obtaining higher battery capacity, preferably at least 0.2, preferably at least 0.35, and more preferably at least 0.4. In the formula (2), z2 indicating the content of the element M, which is a value that can be adjusted as appropriate in accordance with desired battery characteristics, is at least 0 and up to 0.4 and may be up to 0.3 or up to 0.2.

When the composition of the manganese-rich layer 2 satisfies the formula (2), in the production process of the lithium composite oxide, excessive sintering when the firing temperature is high can be inhibited, and the eluted lithium amount can be reduced. As described below, the lithium composite oxide to be obtained has a high degree of circularity and can have high fillability and high energy density.

The composition of the manganese-rich layer 2 can be determined by quantitative analysis of energy dispersive X-ray analysis (EDX) in section observation with a scanning electron microscope, for example. The composition of the manganese-rich layer 2 can be adjusted to a desired range by controlling the composition of a metal component of a second mixed aqueous solution at a second crystallization process (Step S2) as described below, for example.

A thickness t of the manganese-rich layer 2 is at least 5% and up to 20%, preferably at least 5% and up to 15%, and more preferably at least 5.5% and up to 10% of a radius r of the secondary particle 1. The thickness t of the manganese-rich layer 2 is adjusted to the above range, whereby sintering when the firing temperature is high can be inhibited. The thickness t of the manganese-rich layer 2 can be calculated as, when sections of secondary particles are observed with a scanning electron microscope (SEM) with a magnification of 1,000-fold, and 20 secondary particles having a volume average particle diameter 80% to 120% of a volume average particle diameter (Mv) calculated in particle size distribution measured by laser diffraction scattering are arbitrarily selected, an average of the ratio (%) of the thickness of the manganese-rich layer 2 to each secondary particle radius r, for example.

The number of layers of the manganese-rich layer 2 is not limited to a particular number; it may be one layer as illustrated in FIG. 1 or a plurality of layers. When the manganese-rich layer 2 is formed of a plurality of layers, the thickness t of the manganese-rich layer 2 refers to the total thickness of the layers.

(Volume Average Particle Diameter of Nickel-Manganese Composite Hydroxide)

The particle diameter of the composite hydroxide 10 is not limited to a particular diameter and can be a desired range. When the composite hydroxide 10 is used as the precursor of the positive electrode active material, the composite hydroxide 10 has a volume average particle diameter (Mv) of preferably at least 5 μm and up to 20 μm and more preferably at least 6 μm and up to 15 μm. When the volume average particle diameter (Mv) is less than 5 pin, the fillability of the lithium composite oxide to be obtained greatly reduces, and it may be difficult to increase battery capacity per volume when the positive electrode active material is made. In contrast, when the volume average particle diameter (Mv) is greater than 20 μm, although the fillability does not greatly degrade, the specific surface area reduces, and reactivity with a lithium raw material when the positive electrode active material is made reduces, and the positive electrode active material having high battery characteristics cannot be obtained. When the volume average particle diameter (Mv) is extremely large, the obtained positive electrode active material reduces in cycle characteristics and reduces in the interface with an electrolyte solution, and positive electrode resistance may increase to reduce battery output characteristics. The volume average particle diameter (Mv) can be measured using a laser diffraction/scattering particle size analyzer.

(Particle Size Distribution of Nickel-Manganese Composite Hydroxide)

The composite hydroxide 10 preferably has [(D90−D010)/an average particle diameter] as an indicator indicating a spread of particle size distribution of at least 0.60, which may be at least 0.7 or at least 0.8. When [(D90−D10)/the average particle diameter] of the composite hydroxide 10 is within the above range, particle fillability improves, and when the composite hydroxide 10 is used as the precursor of the composite hydroxide 10, the volume energy density of the positive electrode active material of a secondary battery to be obtained can be further higher. [(D90−D10)/the average particle diameter] can be adjusted to the above range by mixing composite hydroxides having different particle diameters together or producing the composite hydroxide using a continuous method of crystallization, for example. As described below, when the composite hydroxide 10 (especially, the central part 3) is formed using the continuous method of crystallization, adjustment to the above range can be easily achieved. In view of inhibiting excessive mixing of fine particles or coarse particles into the composite hydroxide 10, the upper limit of [(D90−D10)/the average particle diameter] is preferably up to 1.2.

In the indicator [(D90−D10)/the average particle diameter] indicating the spread of the particle size distribution, d10 means a particle diameter at which, when the numbers of particles of the respective particle diameters are accumulated from a smaller particle diameter, the accumulated volume reaches 10% of the total volume of all the particles.

D90 means a particle diameter at which, when the numbers of particles are accumulated similarly, the accumulated volume reaches 90% of the total volume of all the particles. The average particle diameter, D90, and D10 can be determined from a volume integral value measured with a laser diffraction/scattering particle size analyzer. For the average particle diameter, the volume average particle diameter (Mv) is used. The volume average particle diameter (Mv), D90, and D10 can be measured using a laser diffraction/scattering particle size analyzer.

Although the composite hydroxide 10 contains a secondary particle formed of a plurality of flocculated primary particles, it may contain a small number of single primary particles such as a primary particle that has not been flocculated as the secondary particle and a primary particle that has fallen from the secondary particle after being flocculated, for example.

(Tap Density of Nickel-Manganese Composite Hydroxide)

The composite hydroxide 10 preferably has a tap density of at least 1.8 g/cm$^3$ and up to 3.2 g/cm$^3$. When the tap density is within the above range, the positive electrode active material to be obtained is excellent in fillability, and the volume energy density of the positive electrode active material of a secondary battery containing this positive electrode active material can be further increased. The tap density can be made within the above range by adjusting the particle size distribution including the average particle diameter of the composite hydroxide 10.

2. Method for Producing Nickel-Manganese Composite Hydroxide

The method for producing a nickel-manganese composite hydroxide of the present embodiment may use any method of production so long as it can produce the composite hydroxide 10 having the multilayer structure in which the composition of the secondary particle inner part 3 and the composition of the manganese-rich layer 2 (the outer circumferential part) are different from each other as described above.

Examples of the method for producing the composite hydroxide 10 include 1) a method that forms particles (the central part 3) of the composite hydroxide by the continuous method of crystallization and then forms the manganese-rich layer 2 by crystallization, 2) a method that successively produces the particles (the central part 3) of the composite hydroxide and the manganese-rich layer 2 by a two-stage, batch type method of crystallization, 3) a method that forms the particles (the central part 3) of the composite hydroxide by spray drying, spray pyrolysis, or the like and then forms the manganese-rich layer 2 by crystallization, and 4) a method that forms the particles (the central part 3) of the composite hydroxide by a batch type method of crystallization, the continuous method of crystallization, spray drying, spray pyrolysis, or the like and then mechanically applies and forms the manganese-rich layer 2.

Among them, the optimum method for producing the composite hydroxide 10 is 1) the method that forms the particles (the central part 3) of the composite hydroxide by the continuous method of crystallization and then forms the manganese-rich layer 2 by crystallization. The continuous method of crystallization is a method of crystallization that supplies a neutralizer while continuously supplying a mixed aqueous solution containing metal salts, controls pH, generates particles of a composite hydroxide, and collects these composite hydroxide particles by overflowing. The continuous method of crystallization can obtain particles with wide particle size distribution more easily and obtain the secondary particle with high fillability more easily than the batch type method of crystallization. In addition, the continuous method of crystallization is suitable for mass production and is an advantageous method of production also industrially.

When the formation of the particles (the central part 3) of the composite hydroxide is performed by the continuous method of crystallization as in 1), for example, the fillability (the tap density) of the composite hydroxide 10 to be obtained can be more improved, and the composite hydroxide 10 having higher filling density and having higher energy density can be produced easily and in large quantities. The following describes an exemplary method of production using the method of production of 1).

Figure 2:
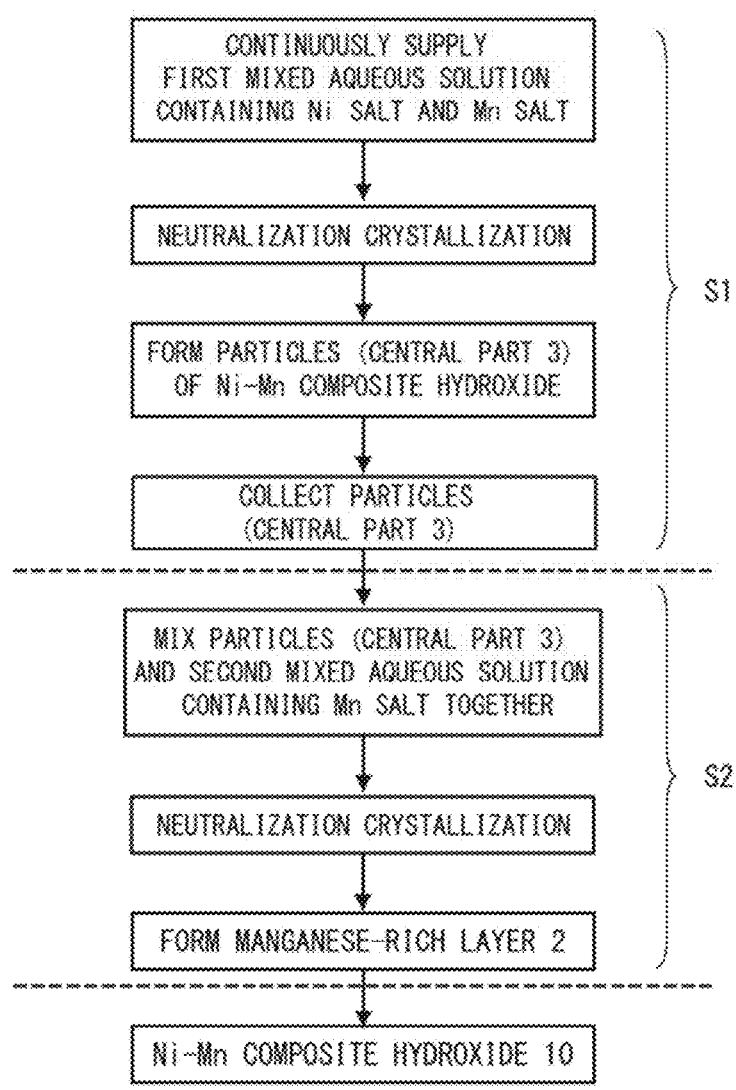
FIG. 2 is a flowchart of an exemplary method for producing a nickel-manganese composite hydroxide of the embodiment.

FIG. 2 is a flowchart of an exemplary method for producing the composite hydroxide 10. When the flowchart of FIG. 2 is described, FIG. 1 is referred to as appropriate. First, particles (the central part 3) of the nickel-manganese composite hydroxide are formed by the continuous method of crystallization, and the generated particles (the central part 3) are collected (Step S1). Next, the collected particles and the second mixed aqueous solution having a molar ratio of Ni, Mn, and M similar to that in the manganese-rich layer are mixed together and are subjected to neutralization crystallization to form the manganese-rich layer 2 (Step S2). The following describes the processes.

(1) First Crystallization Process

At the first crystallization process, first, a first mixed aqueous solution containing at least a nickel salt and a manganese salt is continuously supplied to a reaction aqueous solution and is subjected to neutralization crystallization to form the particles of the nickel-manganese composite hydroxide. At the first crystallization process, the central part 3 of the composite hydroxide 10 is mainly formed. Next, the particles of the nickel-manganese composite hydroxide are collected by overflowing slurry containing the particles (the central part 3) of the nickel-manganese composite hydroxide from a reaction tank.

As to a specific mode of the first crystallization process, a neutralizer (e.g., an alkali solution) is added to the first mixed aqueous solution containing at least a nickel salt and a manganese salt within the reaction tank while stirring at a constant speed to perform neutralization, whereby pH is controlled, and the particles (including the secondary particle corresponding to the central part 3) of the nickel-manganese composite hydroxide are generated through coprecipitation, for example. Together with the neutralizer, a complexing agent may be optionally added thereto. The following describes the components.

(First Mixed Aqueous Solution)

For the first mixed aqueous solution, an aqueous solution dissolving at least a nickel salt and a manganese salt can be used. Further, the first mixed aqueous solution may contain at least one element selected from Co, Al, Ti, V, Cr, Zr, Nb, Mo, Hf, Ta, Fe, and W (hereinafter, also referred to as an "element M"), or an aqueous solution dissolving a nickel salt, a manganese salt, and a salt containing M can be used. For the nickel salt, the manganese salt, and the salt containing M, at least one selected from the group consisting of sulfates, nitrates, and chlorides can be used, for example. Among them, sulfates are preferably used in view of costs and liquid-waste treatment.

The concentration of the first mixed aqueous solution is preferably at least 1.0 mol/L and up to 2.4 mol/L and more preferably at least 1.2 mol/L and up to 2.2 mol/L in terms of the total of the dissolved metal salts. When the concentration of the first mixed aqueous solution is less than 1.0 mol/L in terms of the total of the dissolved metal salts, the concentration is extremely low, and the primary particles forming the composite hydroxide may fail to sufficiently grow. In contrast, when the concentration of the first mixed aqueous solution is greater than 2.4 mol/L, it is greater than a saturated concentration at room temperature, and crystals are reprecipitated, which may cause the risk of clogging of piping or the like. In addition, when the concentration of the first mixed aqueous solution is extremely high, the nucleation amount of the primary particles increases, and the proportion of fine particles in the slurry containing the particles of the composite hydroxide to be obtained may increase. The composition of the metal elements contained in the first mixed aqueous solution and the composition of the metal elements contained in the particles (the central part 3) of the composite hydroxide to be obtained match. Consequently, the composition of the metal elements of the mixed aqueous solution can be adjusted so as to be the same as the composition of the metal elements of the central part 3 of the target composite hydroxide 10. The composition of the metal elements of the central part 3 is not limited to a particular composition so long as it is within a range enabling the composite hydroxide 10 represented by the formula (1) to be obtained when the manganese-rich layer represented by the formula (2) is finally formed.

(Neutralizer)

Neutralization of the first mixed aqueous solution can be performed by adding a neutralizer. For the neutralizer, an alkali solution can be used; an aqueous solution of an alkali metal hydroxide such as sodium hydroxide or potassium hydroxide can be used, for example. Among them, an aqueous sodium hydroxide solution is preferably used in view of costs and handleability. Although the alkali metal hydroxide may be directly added to the reaction aqueous solution to perform neutralization, it is preferably added as an aqueous solution in view of easiness of pH control. In this case, the concentration of the aqueous solution of the alkali metal hydroxide is preferably at least 12% by mass and up to 30% by mass and more preferably at least 20% by mass and up to 30% by mass. When the concentration of the aqueous solution of the alkali metal hydroxide is less than 12% by mass, a supply amount to the reaction tank increases, and particles may fail to sufficiently grow. In contrast, when the concentration of the aqueous solution of the alkali metal hydroxide is greater than 30% by mass, the pH value increases locally at an addition position of the alkali metal hydroxide, and fine particles may be generated.

(Complexing Agent)

The complexing agent is not limited to a particular agent and may be any one that can form a complex through bonding to metal elements such as nickel ions and manganese ions in an aqueous solution; examples of the complexing agent include an ammonium ion supplier. For the ammonium ion supplier, which is not limited to a particular substance, at least one selected from the group consisting of ammonia water, an aqueous ammonium sulfate solution, and an aqueous ammonium chloride solution can be used, for example. Among them, ammonia water is preferably used in view of handleability. When the ammonium ion supplier is used, the concentration of ammonium ions is preferably within a range of at least 5 g/L and up to 25 g/L.

(pH Control)

At the first crystallization process, the pH value of the reaction aqueous solution is controlled to a range of at least 11.0 and up to 13.0 and preferably at least 12.0 and up to 13.0 with a liquid temperature of 25° C. as a basis. When the pH value is greater than 13.0, the growth rate of the primary particles is high, nucleation is likely to occur, and the secondary particle to be obtained is likely to be a particle with a small diameter and less sphericity. In contrast, when the pH value is less than 11.0, the generation rate of the composite hydroxide is extremely lowered, nickel remains in a filtrate, and the composition of the particles (the central part 3) of the composite hydroxide to be obtained may be substantially deviated from a target value.

The particle diameter of the composite hydroxide 10 can be controlled to a desired range by mainly adjusting the particle diameter of the central part 3 as appropriate. The particle diameter of the central part 3 can be controlled to a desired range by adjusting the pH value at the first crystallization process (a continuous crystallization process) as appropriate within the above range, for example.

(Reaction Atmosphere)

At the first crystallization process, in view of inhibiting oxidation of manganese and the like to stably generate the primary particles and the secondary particles, an oxygen concentration in the space within the reaction tank may be controlled to preferably up to 10 volume %, more preferably up to 5 volume %, and even more preferably up to 3 volume %. The oxygen concentration in the atmosphere can be controlled using an inert gas such as nitrogen or argon, for example. Examples of means to adjust the oxygen concentration in the atmosphere to a certain concentration include constantly circulating a certain amount of an atmospheric gas through the atmosphere.

(Reaction Temperature)

At the first crystallization process, the temperature of the aqueous solution (the reaction aqueous solution) within the reaction tank is preferably within a range of at least 35° C. and up to 60° C. and more preferably within a range of at least 40° C. and up to 55° C. When the temperature of the reaction aqueous solution is greater than 60° C., the degree of priority of nucleation increases over particle growth in the reaction aqueous solution within the reaction tank, and the shape of the primary particles forming the composite hydroxide 10 (mainly the central part 3) is likely to be extremely fine. Use of such a composite hydroxide 10 causes a problem in that the fillability of the positive electrode active material to be obtained degrades. In contrast, when the temperature of the reaction aqueous solution is less than 35° C., particle growth tends to be preferential over nucleation in the reaction aqueous solution, and the shapes of the primary particles and the secondary particles forming the composite hydroxide 10 (mainly the central part 3) are likely to increase in size. Use of the composite hydroxide 10 having such coarse secondary particles as the precursor of the positive electrode active material may form the positive electrode active material containing such extremely large coarse particles that irregularities occur during electrode production. Furthermore, the reaction aqueous solution being less than 35° C. causes a problem in that a remaining amount of metal ions in the reaction aqueous solution is large, and reaction efficiency is extremely bad and is likely to cause a problem in that a composite hydroxide containing a large amount of impurity elements is generated.

(2) Second Crystallization Process

At the second crystallization process, a reaction aqueous solution containing the collected particles (the central part 3) of the composite hydroxide and the second mixed aqueous solution containing at least a manganese salt and having a molar ratio of Ni, Mn, and M similar to that in the manganese-rich layer 2 is subjected to neutralization crystallization to form the manganese-rich layer 2 on surfaces of the particles (the central part 3) of the composite hydroxide.

As to a specific mode of the second crystallization process, after the end of the first crystallization process, the collected particles (the central part 3) of the composite hydroxide are moved to a different reaction tank, an aqueous solution containing the particles (the central part 3) of the composite hydroxide is stirred at a constant speed, and the second mixed aqueous solution containing at least manganese (Mn) and a neutralizer (e.g., an alkali solution) is added thereto to perform neutralization, whereby pH is controlled, and the manganese-rich layer 2 is crystallized on the surfaces of the particles (the central part 3) of the composite hydroxide, for example. Together with the neutralizer, a complexing agent may be optionally added thereto. The following describes the components.

(Second Mixed Aqueous Solution)

For the second mixed aqueous solution, an aqueous solution containing at least a manganese salt can be used. Furthermore, the second mixed aqueous solution may contain a nickel salt and a salt of the element M, or an aqueous solution dissolving a nickel salt, a manganese salt, and a salt containing M may be used. For the nickel salt, the manganese salt, and the salt containing M, at least one selected from the group consisting of sulfates, nitrates, and chlorides can be used, for example. Among them, sulfates are preferably used in view of costs and liquid-waste treatment.

The concentration of the second mixed aqueous solution is preferably at least 1.0 mol/L and up to 2.4 mol/L and more preferably at least 1.2 mol/L and up to 2.2 mol/L in terms of the total of the dissolved metal salts. When the concentration of the second mixed aqueous solution is less than 1.0 mol/L in terms of the total of the dissolved metal salts, the concentration is extremely low, and the manganese-rich layer 2 may fail to sufficiently grow on the surfaces of the particles (the central part 3) of the composite hydroxide. In contrast, when the concentration of the second mixed aqueous solution is greater than 2.4 mol/L, it is greater than a saturated concentration at room temperature, and crystals are reprecipitated, which may cause the risk of clogging of piping or the like. In addition, in this case, the nucleation amount of the primary particles increases, and the manganese-rich layer 2 may fail to sufficiently grow on the surfaces of the particles (the central part 3) of the composite hydroxide. The composition of the metal elements contained in the second mixed aqueous solution and the composition of the metal elements contained in the manganese-rich layer to be obtained match. Consequently, the composition of the metal elements of the second mixed aqueous solution can be prepared so as to be the same as the composition of the metal elements (the molar ratio of Ni, Mn, and M) of the target manganese-rich layer 2. The content ratio of the metal elements in the second mixed aqueous solution is Mn singly contained or the content (mol) of Mn being at least 0.6 time the total content (mol) of Ni and M.

(Neutralizer)

Neutralization of the second mixed aqueous solution can be performed by adding a neutralizer. For the neutralizer, an alkali solution can be used; an aqueous solution of an alkali metal hydroxide such as sodium hydroxide or potassium hydroxide can be used, for example. Among them, an aqueous sodium hydroxide solution is preferably used in view of costs and handleability. Although the alkali metal hydroxide may be directly added to the reaction aqueous solution to perform neutralization, it is preferably added as an aqueous solution in view of easiness of pH control. In this case, the concentration of the aqueous solution of the alkali metal hydroxide is preferably at least 12% by mass and up to 30% by mass and more preferably at least 20% by mass and up to 30% by mass. When the concentration of the aqueous solution of the alkali metal hydroxide is less than 12% by mass, a supply amount to the reaction tank increases, and particles may fail to sufficiently grow. In contrast, when the concentration of the aqueous solution of the alkali metal hydroxide is greater than 30% by mass, the pH value increases locally at an addition position of the alkali metal hydroxide, and fine particles may be generated.

(Complexing Agent)

The complexing agent is not limited to a particular agent and may be any one that can form a complex through bonding to metal elements such as nickel ions and manganese ions in an aqueous solution; examples of the complexing agent include an ammonium ion supplier. For the ammonium ion supplier, which is not limited to a particular substance, at least one selected from the group consisting of ammonia water, an aqueous ammonium sulfate solution, and an aqueous ammonium chloride solution can be used, for example. Among them, ammonia water is preferably used in view of handleability. When the ammonium ion supplier is used, the concentration of ammonium ions is preferably within a range of at least 5 g/L and up to 25 g/L.

(pH Control)

At the second crystallization process (a crystallization coating process), the pH value of the reaction aqueous solution is controlled to a range of at least 10.0 and up to 13.0 and preferably at least 11.0 and up to 12.0 with a liquid temperature of 25° C. as a basis. When the pH value is greater than 13.0, nucleation is likely to occur, and the manganese-rich layer 2 is less likely to be formed on the surfaces of the particles (the central part 3) of the composite hydroxide. In contrast, when the pH value is less than 10.0, the generation rate of the manganese-rich layer 2 is extremely lowered, nickel remains in a filtrate, and the composition of the manganese-rich layer 2 may be substantially deviated from a target value.

The thickness t of the manganese-rich layer 2 can be controlled by the supply amount of the metal elements at the second crystallization process, and the supply amount of the second mixed aqueous solution may be adjusted as appropriate such that the manganese-rich layer 2 has a desired thickness. In this process, in accordance with the supply amount of the second mixed aqueous solution, the (entire) composition of the composite hydroxide 10 to be finally obtained changes. For this reason, to increase the film thickness of the manganese-rich layer 2 with the same (entire) composition, the supply amount of the second mixed aqueous solution may be increased with the content of Mn of the second mixed aqueous solution supplied at the second crystallization process (the crystallization coating process) adjusted to be lower. On the other hand, to reduce the thickness of the manganese-rich layer 2 with the same (entire) composition, the supply amount of the second mixed aqueous solution may be reduced with the content of Mn of the second mixed aqueous solution supplied at the second crystallization process (the crystallization coating process) adjusted to be higher.

(Reaction Atmosphere)

In view of inhibiting oxidation of manganese and the like to stably generate the primary particles and the secondary particles forming the manganese-rich layer 2, an oxygen concentration in the space within the reaction tank can be controlled to preferably up to 10 volume %, more preferably up to 5 volume %, and even more preferably up to 3 volume %. Adjustment of the oxygen concentration in the atmosphere can be performed by a method similar to that of the first crystallization process.

(Reaction Temperature)

The temperature of the reaction aqueous solution is, similarly to the first crystallization process, preferably within a range of at least 35° C. and up to 60° C. and more preferably within a range of at least 40° C. and up to 55° C. When the temperature of the reaction aqueous solution is greater than 60° C., the degree of priority of nucleation increases over particle growth in the reaction aqueous solution within the reaction tank, and the shape of the primary particles forming the manganese-rich layer 2 is likely to be extremely fine. In contrast, when the temperature of the reaction aqueous solution is less than 35° C., particle growth tends to be preferential over nucleation in the reaction aqueous solution, and the shapes of the primary particles and the secondary particles forming the manganese-rich layer 2 are likely to increase in size.

(3) Washing Process

The method of production of the present embodiment may include a washing process after the second crystallization process. The washing process is a process that washes away impurities contained in the composite hydroxide 10 obtained in the second crystallization process. For a washing solution, pure water is preferably used. The amount of the washing solution is preferably at least 1 L relative to 300 g of the composite hydroxide 10. When the amount of the washing solution is less than 1 L relative to 300 g of the composite hydroxide 10, washing is insufficient, and the impurities may remain in the composite hydroxide 10. As to a method of washing, the washing solution such as pure water may be passed through a filter such as a filter press, for example. When $SO_4$ remaining in the composite hydroxide 10 is desired to be further washed away, sodium hydroxide, sodium carbonate, or the like is preferably used as the washing solution.

3. Positive Electrode Active Material for Nonaqueous Electrolyte Secondary Battery The positive electrode active material of the present embodiment contains a lithium-nickel-manganese composite oxide (hereinafter, also referred to as a "lithium-metal composite oxide") containing a secondary particle formed of flocculated primary particles and represented by General Formula (3): $Li_{1+t}Ni_{x3}Mn_{y3}M_{z3}O_{2+\beta}$ ($-0.05 \leq t \leq 0.5$, $0.70 \leq x3 \leq 0.95$, $0.05 \leq y3 \leq 0.30$, $x3+y3+z3=1.0$, and $0 \leq \beta \leq 0.5$ are satisfied; and M is at least one element selected from Co, Al, Ti, V, Cr, Zr, Nb, Mo, Hf, Ta, Fe, and W). The lithium-metal composite oxide has a hexagonal layered structure.

In the formula (3), x3 indicating the content of Ni is at least 0.70 and up to 0.95. When the content of Ni is within the above range, a secondary battery containing the lithium-metal composite oxide as the positive electrode active material has high battery capacity. In the formula (3), (1+t) indicating the content of Li is at least 0.95 and up to 1.50 and preferably at least 0.95 and up to 1.20.

In the formula (3), y3 indicating the content of Mn is at least 0.05 and up to 0.30. The positive electrode active material of the present embodiment is produced using the composite hydroxide 10 having the manganese-rich layer as the precursor and can thereby be higher in the degree of circularity and more excellent in fillability and energy density than a conventional positive electrode active material comparably containing Mn as described below.

In the formula (3), M is at least one element selected from Co, Al, Ti, V, Cr, Zr, Nb, Mo, Hf, Ta, Fe, and W, and z3 indicating the content of M can be at least 0 and up to 0.25. M containing Co, for example, provides excellent output characteristics and cycle characteristics. In the formula (3), β is a coefficient that changes in accordance with the valence number of the metal elements other than lithium contained in the lithium-metal composite oxide and the atom number ratio of lithium to the metal elements other than lithium. As described above, the composition ratio of Ni, Mn, and the element M of the positive electrode active material can be adjusted to the above range by adjusting the composition ratio of the composite hydroxide 10.

The positive electrode active material has a degree of circularity of the secondary particle calculated by image analysis of at least 0.95. When the degree of circularity is within the above range, the secondary particles experience less sintering flocculation and show high tap density, whereby fillability improves, by which a secondary battery having high energy density can be obtained. The upper limit of the degree of circularity, which is not limited to a particular value, is less than 1.00. The degree of circularity of the positive electrode active material can be adjusted to the above range by firing the composite hydroxide 10 having the manganese-rich layer represented by the formula (2) as a precursor at a firing temperature described below.

The degree of circularity was calculated using a flow type particle image analyzer (FPIA-3000 manufactured by Sysmex). A small amount of sample is added to an aqueous or nonaqueous solution and is introduced to the analyzer as a suspension, and then the analyzer can consecutively photograph images of secondary particles in the suspension and perform image analysis. The degree of circularity is calculated using the following expression from the projected area and the circumferential length of each of the photographed secondary particles.

$$E = 4\pi S/L^2 \quad \text{(Expression)}$$

(in the expression, E is the degree of circularity, S is the projected area of the secondary particle, L is the circumferential length of the secondary particle, and π is the ratio of the circumference of a circle to its diameter.)

The positive electrode active material has a (003)-plane crystallite diameter by X-ray diffraction measurement of at least 160 nm and up to 300 nm and preferably at least 160 nm and up to 200 nm. When the crystallite diameter is within the above range, the positive electrode active material is high in crystallinity and is excellent in battery capacity and output characteristics. The crystallite diameter of the positive electrode active material of the present embodiment is adjusted to the above range owing to manganese in the manganese-rich layer of the composite hydroxide 10 gradually diffusing into a particle inner part at a firing process (Step S4) described below.

The positive electrode active material has a lithium amount eluted to water (an eluted Li amount) of up to 0.2% by mass relative to the entire positive electrode active material. When the Li eluted amount is within the above range, crosslinking of a binding agent or the like is inhibited during preparation of the positive electrode mixture paste, and gelation of the paste can be prevented. The eluted Li amount can be adjusted to the above range by firing a lithium mixture containing the composite hydroxide 10 having the manganese-rich layer on its surface at a high temperature (e.g., at least 800° C.) as described above. The lower limit of the eluted Li is at least 0.0005% by mass, for example. The eluted Li amount is only required to inhibit gelation when a desired positive electrode mixture paste is prepared and may be at least 0.01% by mass and up to 0.15% or at least 0.05% by mass and up to 0.12% by mass depending on conditions. The eluted Li amount can be measured by dispensing 20 g of the obtained positive electrode active material, charging and immersing it into 100 cc of pure water at 25° C., stirring it for 30 minutes, and subjecting the supernatant obtained after being allowed to stand for 10 minutes to neutralization titration using an aqueous HCl solution.

The positive electrode active material has a volute average particle diameter (Mv) of at least 4 μm and up to 20 μm in particle size distribution measured by laser diffraction scattering. The positive electrode active material preferably has [(D90−D10)/Mv] indicating a particle diameter variation index calculated from an accumulated 90 volume % diameter (D90), an accumulated 10 volume % diameter (D10), and the volume average particle diameter (Mv) of at least 0.60. When the variation index is within the above range, being good in fillability, and showing high tap density, the positive electrode active material has high energy density. In view of inhibiting excessive mixing of fine particles or coarse particles into the positive electrode active material, the upper limit of [(D90−D10)/the average particle diameter] is preferably up to 1.2.

The positive electrode active material has a specific surface area of preferably at least 0.20 m$^2$/g and up to 0.70 ma/g and more preferably at least 0.30 m$^2$/g and up to 0.50 ma/g. When the specific surface area is less than 0.20 m/g, a contact area between the positive electrode active material and the electrolyte solution reduces, and output characteristics degrade. When the specific surface area is greater than 0.70 m$^2$/g, a contact area with water in the air increases, whereby weatherability degrades, and gelation during paste preparation is likely to occur.

The tap density of the positive electrode material is preferably within a range of at least 2.2 g/cm$^3$ and up to 3.6 g/cm$^3$ and more preferably within a range of at least 2.3 g/cm$^3$ and up to 3.6 g/cm$^3$. When the tap density is within the above range, the positive electrode material achieves both excellent battery capacity and fillability, and battery energy density can be further improved.

Although the positive electrode active material contains a secondary particle formed of a plurality of flocculated primary particles, it may contain a small number of single primary particles such as a primary particle that has not been flocculated as the secondary particle and a primary particle that has fallen from the secondary particle after being flocculated, for example. The positive electrode active material may contain a lithium-metal composite oxide other than the lithium-metal composite oxide according to the present embodiment to the extent that the effects of the present invention are not impaired.

4. Method for Producing Positive Electrode Active Material for Nonaqueous Electrolyte Secondary Battery The method for producing a positive electrode active material of the present embodiment is a method for producing a positive electrode active material for a nonaqueous electrolyte secondary battery containing a nickel-manganese composite hydroxide represented by General Formula (3): $Li_{1+r}Ni_{x3}Mn_{y3}M_{z3}O_{2+\beta}$ (−0.05≤t≤0.5, 0.70≤x3≤0.95, 0.05≤y3≤0.30, x3+y3+z3=1.0, and 0≤β≤0.5 are satisfied; and M is at least one element selected from Co, Al, Ti, V, Cr, Zr, Nb, Mo, Hf, Ta, Fe, and W) and formed of a secondary particle formed of flocculated primary particles.

Figure 3:
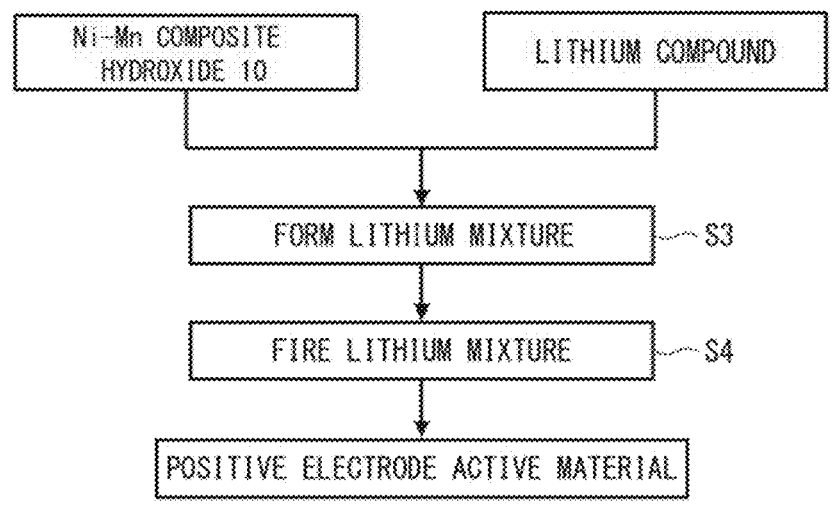
FIG. 3 is a flowchart of an exemplary method for producing a positive electrode active material of the embodiment.

FIG. 3 is a flowchart of an exemplary method for producing a positive electrode active material of the present embodiment. The method for producing a positive electrode active material includes mixing the nickel-manganese composite hydroxide 10 (the composite hydroxide 10) and a lithium compound together to form a lithium mixture (Step S3) and firing the lithium mixture in an oxidative atmosphere at a temperature of at least 800° C. and up to 950° C. to obtain a lithium-nickel-manganese composite oxide (Step S4). The following describes the processes.

(Mixing Process)

First, the composite hydroxide 10 and the lithium compound are mixed together to form a lithium mixture (Step S3). The lithium compound is not limited to a particular compound, and known lithium compounds can be used; preferred examples thereof include lithium hydroxide, lithium nitrate, lithium carbonate, and mixtures thereof in view of availability. Among them, for the lithium compound, lithium hydroxide and lithium carbonate are more preferred in view of handleability and quality stability.

The composite hydroxide 10 may be subjected to oxidizing roasting before the mixing process to transform at least part of or the whole of the composite hydroxide 10 into the form of a nickel-manganese composite oxide, which may be mixed therewith. By being transformed into the form of the nickel-manganese composite oxide, the reaction with the lithium compound is made easier. The oxidizing roasting may be performed by a known method and may be subjected to heat treatment in an oxidative atmosphere, for example. The temperature of the heat treatment may be a temperature enabling transformation into the composite oxide, which can be at least 350° C. and up to 750° C. The time of the heat treatment is normally about 1 to 12 hours.

The composite hydroxide 10 and the lithium compound are mixed together such that the ratio (Li/Me) between the atom number of metals other than lithium in the lithium mixture, that is to say, the sum (Me) of the atom numbers of nickel, manganese, and an element (M) and the atom number (Li) of lithium is at least 0.95 and up to 1.50 and preferably at least 0.95 and up to 1.20. Li/Me does not change before and after firing, and the Li/Me ratio mixed in this mixing process is a Li/Me ratio in the positive electrode active material, and Li/Me in the lithium mixture is mixed so as to be the same as Li/Me in the positive electrode active material to be obtained.

For mixing, general mixers can be used; examples thereof include shaker mixers, Loedige mixers, Julia mixers, and V blenders. Mixing may be performed sufficiently to the extent that the skeleton of the composite hydroxide 10 is not destroyed.

(Firing Process)

Next, the lithium mixture is fired to obtain the lithium-nickel-manganese composite oxide (Step S4). In the method of production of the present embodiment, the composite hydroxide 10 having the manganese-rich layer 2 and the lithium compound are mixed together and are fired at a relatively high temperature (e.g., at least 800° C. and up to 950° C.). The degree of sintering of the secondary particles of the composite hydroxide 10 during the firing relates to the Mn/Ni ratio: when the Mn/Ni ratio is low (that is, the content ratio of Ni is high), the degree of sintering increases; when the Mn/Ni ratio is high (that is, the content ratio of Mn is high) on the other hand, the degree of sintering reduces. Consequently, when the particle surface has the manganese-rich layer 2, sintering during the firing can be inhibited. Further, the eluted lithium amount relates to the firing temperature: when the firing temperature is high, the eluted lithium amount decreases; when the firing temperature is low, the eluted lithium amount increases. Consequently, by firing the composite hydroxide having the manganese-rich layer 2 on its surface and the lithium compound at a high temperature, the eluted lithium amount can be reduced while inhibiting sintering among the secondary particles.

The lithium mixture is fired at a high temperature, whereby the elements in the manganese-rich layer 2 can be diffused, and the composition of the positive electrode active material after the firing can be made uniform. The composition of the positive electrode active material after the firing may partially have a part that is nonuniform in composition derived from the manganese-rich layer 2. Although the positive electrode active material having the manganese-rich layer 2 on its surface increases in reaction resistance, when the composition of the positive electrode active material after the firing is made uniform, for example, the reaction resistance of the secondary battery to be obtained can be reduced.

The composition uniformity of the positive electrode active material after the firing can be determined by analyzing the compositions of the central part and a surface layer part of the secondary particle by EDX analysis of a scanning transmission electron microscope (S-TEM) on secondary particle sections, for example. In the positive electrode active material (the lithium-metal composite oxide), the surface layer part is a part corresponding to the manganese-rich layer 2 of the composite hydroxide 10, and the inner part of the surface layer part is the central part. From the composition ratio (the manganese concentration ratio) of the surface layer part to the central part obtained by the EDX analysis, the composition uniformity of the lithium-metal composite oxide can be evaluated.

The manganese concentration ratio (the manganese concentration of the surface layer/the manganese concentration of the central part) is preferably within a range of at least 0.9 and up to 1.2 in view of reducing the reaction resistance. The manganese concentration ratio can be measured by analyzing EDX analysis values with up to 5% of the radius from the surface of the secondary particle as the surface layer part and with the inner part thereof as the central part in view of determining the composition uniformity. Measurement is preferably performed by analyzing a plurality of sites such that an average composition for each of the central part and the surface layer part of the secondary particle can be obtained, and three or more points for each of them are preferably analyzed and averaged. Measurement is preferably performed by arbitrarily selecting 20 secondary particles having a volume average particle diameter 80% to 120% of the volume average particle diameter (Mv) calculated in particle size distribution measured by laser diffraction scattering, determining EDX analysis values for each of the selected secondary particles, and number-averaging the EDX analysis values.

The firing is performed in an oxidative atmosphere at at least 800° C. and up to 950° C. When the firing temperature is less than 800° C., diffusion of lithium does not sufficiently proceed, whereby excessive lithium remains, and the eluted lithium amount may increase. In addition, when the firing temperature is less than 800° C., the firing is not sufficiently performed, whereby the tap density may reduce, or the uniformity of the composition of nickel, manganese, and the like in the particle inner part is not sufficiently obtained, and sufficient characteristics are not necessarily obtained when used for a battery. In contrast, when the firing temperature is greater than 950° C., sintering of the secondary particles occurs, and the secondary particles increase in size to reduce the specific surface area, thus causing a problem in that when the positive electrode active material to be obtained is used for a battery, positive electrode resistance increases to reduce battery capacity. The firing time, which is not limited to a particular time, is about at least 1 hour and up to 24 hours.

In view of uniformly conducting a reaction of the composite hydroxide 10 or the nickel-manganese composite oxide obtained by oxidizing it and the lithium compound, the temperature is preferably raised up to the firing temperature with a temperature raising rate within a range of at least 1° C./min and up to 10° C./min, for example. Furthermore, before firing, the lithium compound is held at a temperature near the melting point of the lithium compound for about 1 hour to 10 hours, whereby the reaction can be conducted more uniformly.

In particle size distribution measured by laser diffraction scattering, a value obtained by dividing an accumulated 50 volume % diameter (D50) of the lithium composite oxide after the firing by an accumulated 50 volume % diameter (D50) of the composite hydroxide 10 before the firing (the lithium composite oxide D50 after the firing/the composite hydroxide D50 before the firing) is preferably up to 1.2. When the value is out of the above range, the secondary particles increased in size reduce the specific surface area, thus causing a problem in that when the positive electrode active material to be obtained is used for a battery, positive electrode resistance increases to reduce battery capacity. The lower limit of the lithium composite oxide D50 after the firing/the composite hydroxide D50 before the firing is not limited to a particular value and may be at least 0.80 or at least 0.90, for example.

5. Nonaqueous Electrolyte Secondary Battery

The following describes an example of the nonaqueous electrolyte secondary battery (hereinafter, also referred to as a "secondary battery") of the present embodiment for each component. The secondary battery of the present embodiment is a secondary battery including a positive electrode containing the positive electrode active material. The secondary battery may include the positive electrode, a negative electrode, and a nonaqueous electrolyte solution or include the positive electrode, the negative electrode, and a solid electrolyte, for example. The secondary battery of the present embodiment may include components similar to those of a general lithium-ion secondary battery. The following describes a secondary battery including the nonaqueous electrolyte solution as an example of the secondary battery of the present embodiment. The embodiment described below is only by way of example, and the secondary battery can be performed by forms with various modifications and improvements made based on the knowledge of those skilled in the art including the following embodiment. The secondary battery is not limited to particular uses.

(Positive Electrode)

Using the positive electrode active material, the positive electrode of the secondary battery is produced. The following describes an example of a method for manufacturing the positive electrode. First, the positive electrode active material (powdery), an electric conductor, and a binding agent (binder) are mixed together, activated carbon as needed and a solvent for viscosity adjustment or the like are further added thereto, and this mixture is kneaded to produce a positive electrode mixture paste.

The mixture ratio of the materials in the positive electrode mixture is a factor for determining the performance of a lithium secondary battery and can thus be adjusted in accordance with uses. The mixture ratio of the materials can be similar to that of a positive electrode of known lithium secondary batteries; when the total mass of the solid content of the positive electrode mixture excluding the solvent is 100% by mass, 60 to 95% by mass of the positive electrode active material, 1 to 20% by mass of the electric conductor, and 1 to 20% by mass of the binding agent can be contained, for example.

The obtained positive electrode mixture paste is applied to the surface of a collector made of aluminum foil and is dried to scatter the solvent to produce a sheet-shaped positive electrode, for example. As needed, pressurizing may be performed using a roll press or the like in order to increase electrode density. The thus obtained sheet-shaped positive electrode is cut or the like into appropriate size in accordance with a target battery to be served for production of the battery. However, the method for producing the positive electrode is not limited to the exemplified one and may be another method.

Examples of the electric conductor include graphite (natural graphite, artificial graphite, expanded graphite, and the like) and carbon black materials such as acetylene black and Ketjen black.

Examples of the binding agent (binder), which plays a role of binding active material particles, include polyvinylidene fluoride (PVDF), polytetrafluoroethylene (PTFE), fluoro rubber, ethylene-propylene rubber, styrene butadiene, cellulosic resins, and polyacrylic acid.

As needed, a solvent for dispersing the positive electrode active material, the electric conductor, and the activated carbon and dissolving the binding agent is added to the positive electrode mixture. Specific examples of the solvent include organic solvents such as N-methyl-2-pyrrolidone. The activated carbon can be added to the positive electrode mixture in order to increase electric double layer capacity.

(Negative Electrode)

Examples of the negative electrode include metal lithium, lithium alloys. The negative electrode may be formed by applying a negative electrode mixture obtained by mixing a binding agent with a negative electrode active material that can occlude and de-insert lithium ions and adding an appropriate solvent to be paste form to the surface of a metal foil collector such as copper, drying, and compressing it in order to increase electrode density as needed.

Examples of the negative electrode active material include natural graphite, artificial graphite, organic compound fired bodies such as phenol resin, and powder of carbon substances such as coke. In this case, examples of a negative electrode binding agent include fluorine-containing resins such as PVDF similarly to the positive electrode. Examples of a solvent in which the active material and the binding agent are dispersed include organic solvents such as N-methyl-2-pyrrolidone.

(Separator)

A separator is interposed between the positive electrode and the negative electrode. The separator separates the positive electrode and the negative electrode from each other and holds an electrolyte; examples thereof include thin films formed of polyethylene, polypropylene, or the like, the films having many minute holes.

(Nonaqueous Electrolyte Solution)

A nonaqueous electrolyte solution is a solution obtained by dissolving a lithium salt as a supporting salt in an organic solvent. Examples of the organic solvent include cyclic carbonates such as ethylene carbonate, propylene carbonate, butylene carbonate, and trifluoro propylene carbonate; chain carbonates such as diethyl carbonate, dimethyl carbonate, ethylmethyl carbonate, and dipropyl carbonate; ether compounds such as tetrahydrofuran, 2-methyltetrahydrofuran, and dimethoxy ethane; sulfur compounds such as ethylmethyl sulfone and butane sulfone; and phosphorous compounds such as triethyl phosphate and trioctyl phosphate; for the solvent, one or two or more in combination selected from the above can be used.

Examples of the supporting salt include $LiPF_6$, $LiBF_4$, $LiClO_4$, $LiAsF_6$, $LiN(CF_3SO_2)_2$ and their composite salts. Furthermore, the nonaqueous electrolyte solution may contain radical scavengers, surfactants, fire retardants, and the like.

(Shape and Configuration of Battery)

The nonaqueous electrolyte secondary battery of the present invention including the positive electrode, the negative electrode, the separator, and the nonaqueous electrolyte solution described above can be formed into various shapes such as cylindrical and stacked shapes. For any shape employed, the positive electrode and the negative electrode are stacked via the separator to form an electrode body, the obtained electrode body is impregnated with the nonaqueous electrolyte solution, a positive electrode collector and a positive electrode terminal communicating with the outside and a negative electrode collector and a negative electrode terminal communicating with the outside are each connected using a collector lead, and the electrode body is hermetically sealed in a battery case to complete the nonaqueous electrolyte secondary battery.

EXAMPLES

The following describes specific examples of the present invention. The present invention, however, is not limited to these examples.

Example 1

[Production of Composite Hydroxide]
(First Crystallization Process)

A prescribed amount of pure water was put into a reaction tank (a volume of 60 L), the temperature (liquid temperature) within the reaction tank was set to 49° C. while stirring, and a nitrogen gas was circulated through the reaction tank to make a non-oxidative atmosphere. The oxygen concentration in the space within the reaction tank at this time was 2.0%. Simultaneously and continuously added to this reaction tank were a 2.0 mol/L mixed aqueous solution dissolving nickel sulfate, cobalt sulfate, and manganese sulfate so as to give a molar ratio among nickel:cobalt:manganese of 80:10:10, a 25% by mass aqueous sodium hydroxide solution as an alkali solution, and a 25% by mass ammonia water as a complexing agent to perform a neutralization crystallization reaction. In this process, the pH value of the reaction liquid within the tank was adjusted to be 12.3 with a liquid temperature of 25° C. as a basis. The ammonium ion concentration in the reaction tank was in a range of 12 to 15 g/L. The flow rate of the total of the mixed solution, the aqueous sodium hydroxide solution, and the ammonia water was controlled so as to give a residence time of the metal salts contained in the mixed aqueous solution of 8 hours. The neutralization crystallization reaction in the reaction tank stabilized, then slurry containing a nickel-cobalt-manganese composite hydroxide was collected from an overflow port.

(Second Crystallization Process)

The collected slurry in a volume of 30 L was moved to another reaction tank (a volume of 60 L), the temperature (liquid temperature) within the reaction tank was set to 49° C. while stirring, and a nitrogen gas was circulated through the reaction tank to make a non-oxidative atmosphere. The oxygen concentration in the space within the reaction tank at this time was 2.0%. Added to this reaction tank at 0.10 L/min was 15 L of a 2.0 mol/L mixed aqueous solution dissolving nickel sulfate, cobalt sulfate, and manganese sulfate so as to give a molar ratio among nickel:cobalt:manganese of 50:10:40. Simultaneously, a 25% by mass ammonia water and a 25% by mass aqueous sodium hydroxide solution were added to the reaction liquid within the reaction tank at a constant speed, crystallization was performed for 2.5 hours while controlling the pH value to 11.2 with a liquid temperature of 25° C. as a basis with the ammonia concentration in the reaction liquid held in a range of 12 to 15 g/L, and the product was subjected to suction filtration to obtain a cake of a nickel-manganese composite hydroxide. After filtration, the nickel-manganese composite hydroxide cake present within the filter was subjected to suction filtration while supplying 1 L of pure water for 140 g of the composite hydroxide and passing it therethrough to wash away impurities. Furthermore, the nickel-manganese composite hydroxide cake after being washed was dried in the air at 120° C. to obtain a nickel-manganese composite hydroxide.

Figure 4:
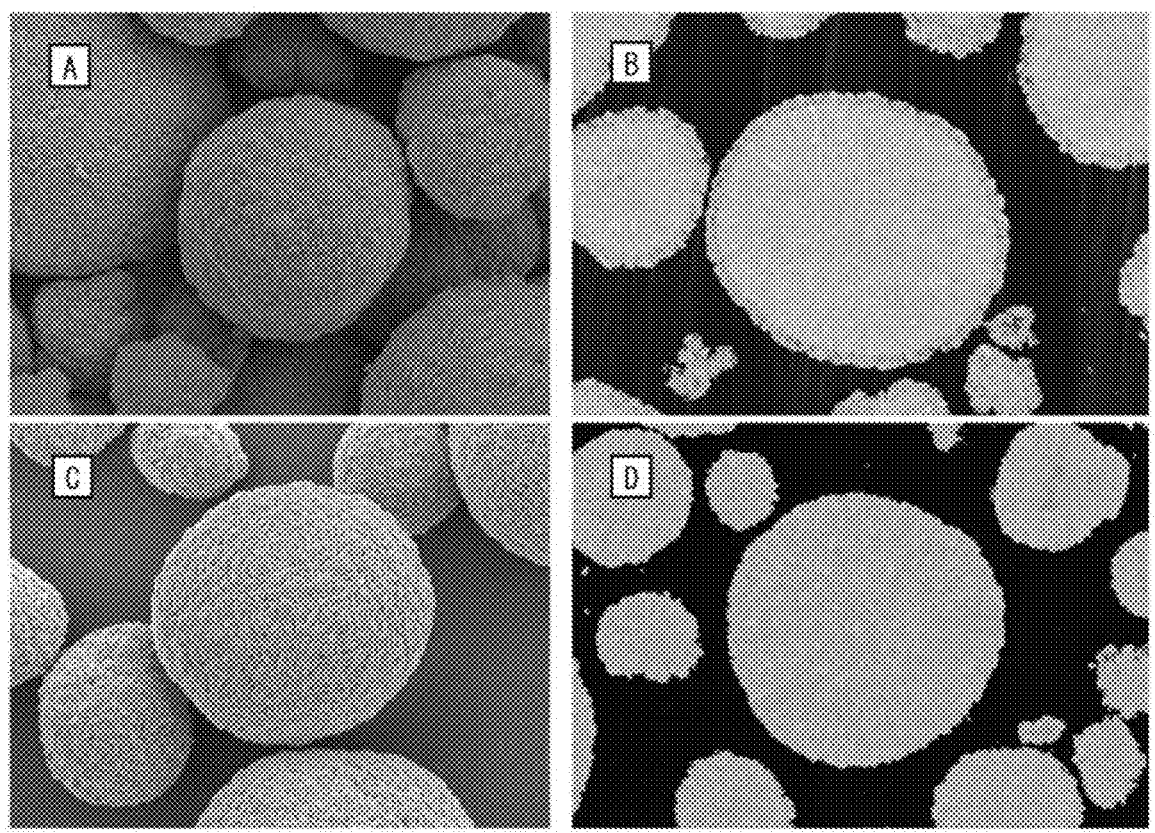
FIG. 4(A) and FIG. 4(B) are photographs of an exemplary appearance and section of a nickel-manganese composite hydroxide of Example 1.
FIG. 4(C) and FIG. 4(D) are photographs of an exemplary appearance and section of a nickel-manganese composite hydroxide of Comparative Example 1.

A surface and a sectional structure of the obtained nickel-manganese composite hydroxide were observed with a scanning electron microscope (SEM). FIGS. 4A and 4B show the surface (4A) and the sectional structure (4B) of the obtained nickel-manganese composite hydroxide. The result of surface observation revealed that a secondary particle having high sphericity was obtained. Next, sections of secondary particles were SEM-observed with a magnification of 1,000-fold, and 20 secondary particles having a volume average particle diameter 80% to 120% of a volume average particle diameter (Mv) calculated in particle size distribution measured by laser diffraction scattering were arbitrarily selected. For each of the selected secondary particles, the ratio (%) of the thickness of the manganese-rich layer to its radius was determined, and the measured values of the respective secondary particles were number-averaged to determine the ratio of the thickness of the manganese-rich layer of the nickel-manganese composite hydroxide. It was revealed that the thickness of the outer circumferential part (the manganese-rich layer) was 7.8% of the secondary particle radius.

The particle size distribution of the obtained nickel-manganese composite hydroxide was measured using a laser diffraction scattering type particle size distribution measurement apparatus. Consequently, the volume-average particle diameter Mv was 10.8 µm, and [(D90–D10)/the average particle diameter] was 0.87.

The tap density of the obtained nickel-manganese composite hydroxide was measured using a tapping apparatus (KYT 3000 manufactured by Seishin Enterprise Co., Ltd.) and was calculated from a volume and a sample weight after 500 times of tapping. Consequently, the tap density was 2.00 g/cm$^3$.

The obtained nickel-manganese composite hydroxide was dissolved with an inorganic acid and was subjected to chemical analysis by ICP emission spectrometry, and it was revealed that its composition was $Ni_{0.70}Co_{0.10}Mn_{0.20}(OH)$ and that particles with a target composition were obtained. Table 1 lists characteristics of the obtained nickel-manganese composite hydroxide.

[Production of Positive Electrode Active Material]

The nickel-manganese composite hydroxide was inserted into a firing vessel made of magnesia, was heated up to 500° C. in the air with a flow rate of 12 L/min using an enclosed electric furnace, was held for 2 hours, and was subjected to furnace cooling to room temperature to obtain a nickel-manganese composite oxide.

The above nickel-manganese composite oxide and lithium carbonate were weighed so as to give a Li/Me of 1.03 and were thoroughly mixed together using a shaker mixer (TURBULA Type T2C manufactured by Willy A. Bachofen (WAB)) with strength to the extent that the skeleton of the precursor was maintained to obtain a lithium mixture (the mixing process).

This lithium mixture was inserted into a firing vessel made of magnesia, and using an enclosed electric furnace, the temperature was raised up to 860° C. at a temperature rising rate of 3.00° C./min in the oxygen atmosphere with a flow rate of 12 L/min and was held for 10 hours, and the lithium mixture was subjected to furnace cooling to room temperature to obtain a lithium-metal composite oxide (the firing process).

A surface structure of the obtained positive electrode active material was observed with a scanning electron microscope, and it was revealed that particles having good sphericity were obtained similarly to the nickel-manganese composite hydroxide. The degree of circularity of the obtained positive electrode active material was calculated using a flow type particle image analyzer (FPIA-3000 manufactured by Sysmex), and the degree of circularity was 0.961.

The half width of the (003) plane of the obtained positive electrode active material was measured using an X-ray diffraction apparatus (X'Pert PRO manufactured by PANalytical), and the crystallite diameter of the (003) plane was determined from the obtained (003)-plane half width by the Scherrer equation, which was 1,658 Å.

The obtained positive electrode active material was dispensed in an amount of 20 g, was charged and immersed into 100 cc of pure water at 25° C., and was stirred for 30 minutes; the supernatant after being allowed to stand for 10 minutes was subjected to titration using an aqueous HCl solution and eluted lithium was calculated, and the eluted lithium amount was 0.12 wt %.

Similarly to the nickel-manganese composite hydroxide, particle size distribution measurement was performed on the obtained positive electrode active material. It was revealed that the average particle diameter was 10.5 µm and [(D90–D10)/the average particle diameter] was 0.83. A value obtained by dividing the accumulated 50 volume % diameter (D50) of the fired product by the accumulated 50 volume % diameter (D50) of the nickel composite hydroxide was 0.97.

The specific surface area of the obtained positive electrode active material was measured by the BET method by nitrogen adsorption. Consequently, the specific surface area was 0.35 m$^2$/g.

Similarly to the nickel-manganese composite hydroxide, tap density measurement was performed on the obtained positive electrode active material. Consequently, the tap density was 2.48 g/cm$^3$.

The obtained positive electrode active material was dissolved with an inorganic acid and was subjected to chemical analysis by ICP emission spectrometry, and it was revealed that its composition was $Li_{1.03}Ni_{0.70}Co_{0.10}M_{n0.20}O_2$ and that particles with a target composition were obtained.

Secondary particle sections of the obtained positive electrode active material (the lithium-metal composite oxide) were subjected to EDX analysis with a scanning transmission electron microscope (S-TEM). Twenty secondary particles having a volume average particle diameter 80% to 120% of the volume average particle diameter (Mv) calculated in particle size distribution measured by laser diffraction scattering were arbitrarily selected. With up to 5% of the radius from the surface of each of the selected secondary particles as a surface layer part, for the surface layer part and a central part inside the surface layer part, arbitrary five points for each of them were analyzed and averaged to determine the composition ratio (the manganese concentration ratio) of the surface layer part to the central part in each of the secondary particles. The manganese concentration ratios of the respective secondary particles were number-averaged to determine the manganese concentration ratio of the positive electrode active material. Table 2 lists characteristics of the obtained positive electrode active material.

[Production of Battery]

Figure 5:
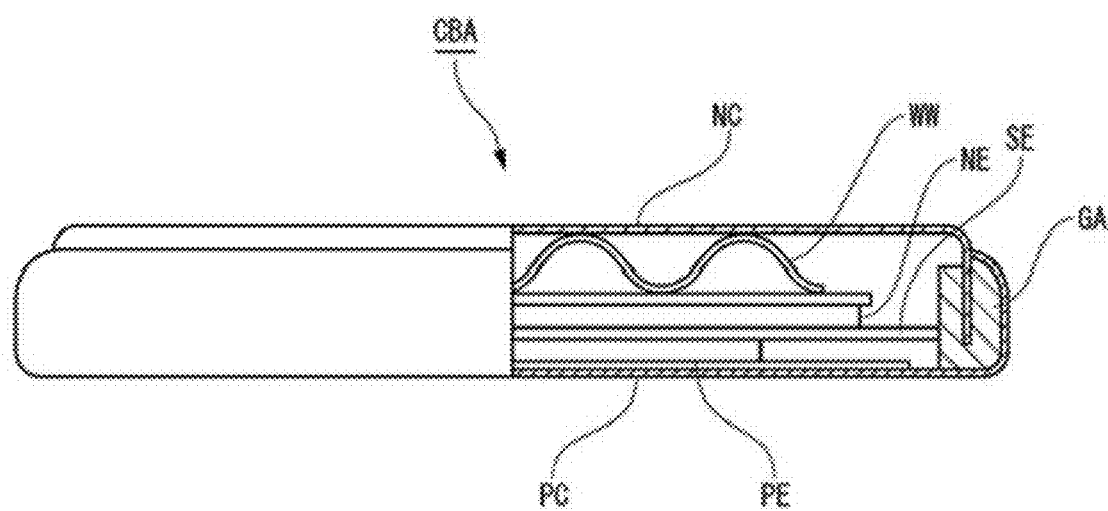
FIG. 5 is a schematic sectional view of a coin-type battery used for the evaluation of battery characteristics.

Mixed together were 52.5 mg of the obtained positive electrode active material, 15 mg of acetylene black, and 7.5 mg of a polytetrafluoroethylene resin (PTFE), the resultant mixture was press-formed at a pressure of 100 MPa to a diameter of 11 mm and a thickness of 100 pun to form a positive electrode (an electrode for evaluation) PE illustrated in FIG. 5. The produced positive electrode PE was dried in a vacuum drier at 120° C. for 12 hours, and then using this positive electrode PE, a 2032 type coin battery CBA was produced in a glove box in an Ar atmosphere and the dew point of which was controlled to −80° C. For a negative electrode NE, lithium (Li) metal with a diameter of 17 mm and a thickness of 1 mm was used. For an electrolyte solution, a liquid mixture of an equivalent amount of ethylene carbonate (EC) and diethyl carbonate (DEC) with 1 M $LiClO_4$ as a supporting electrolyte (manufactured by Tomiyama Pure Chemical Industries, Ltd.) was used. For a separator SE, a polyethylene porous film with a film thickness of 25 μm was used. The coin battery has a gasket GA and a wave washer WW, and the coin-type battery was assembled with a positive electrode can PC and a negative electrode can NC.

An initial discharging capacity was determined as follows: the produced coin-type battery was allowed to stand for about 24 hours, was charged to a cutoff voltage 4.3 V with a current density to the positive electrode of 0.1 $mA/cm^2$ after an open circuit voltage (OCV) stabilized, and was discharged to a cutoff voltage 3.0 V after a one-hour suspension; and the capacity at this time was taken as the initial discharging capacity. For the discharging capacity, a multi-channel voltage/current generator (R6741A manufactured by Advantest Corporation) was used. From the result of charging/discharging measurement, a discharge voltage was calculated, and from this value, the tap density, and the initial discharging capacity, volume energy density was calculated from the expression Volume energy density (Wh/L)=average discharge voltage (V)×discharging capacity (A/kg)×tap density (kg/L). Table 2 lists measurement results of the initial charging and discharging capacities and the volume energy density of the obtained active material.

Example 2

A nickel-manganese composite hydroxide (a precursor) and a positive electrode active material were produced similarly to Example 1 except that the molar ratio among nickel:cobalt:manganese of the second mixed aqueous solution supplied at the crystallization coating process (the second crystallization process) was adjusted to be 40:10:50 and the supply amount of the second mixed aqueous solution was 10 L. Table 1 lists characteristics of the obtained nickel-manganese composite hydroxide. Table 2 lists characteristics and electrochemical characteristics evaluation results of the obtained positive electrode active material.

Example 3

A nickel-manganese composite hydroxide and a positive electrode active material were produced similarly to Example 1 except that the firing temperature at the firing process was 880° C. Table 1 lists characteristics of the obtained nickel-manganese composite hydroxide. Table 2 lists characteristics and electrochemical characteristics evaluation results of the obtained positive electrode active material.

Comparative Example 1

A nickel-manganese composite hydroxide and a positive electrode active material were produced similarly to Example 1 except that the molar ratio among nickel:cobalt:manganese of the mixed aqueous solution supplied at the continuous crystallization process was adjusted to be 70:10:20 and the slurry the pH value of which had been adjusted to be 12.0 with a liquid temperature of 25° C. as a basis was filtered and washed without the crystallization coating process to obtain a composite hydroxide. Table 1 lists characteristics of the obtained nickel-manganese composite hydroxide, and FIG. 4C and FIG. 4D show a surface and a sectional structure, respectively. Table 2 lists characteristics and electrochemical characteristics evaluation results of the obtained positive electrode active material.

Comparative Example 2

A nickel-manganese composite hydroxide and a positive electrode active material were produced similarly to Example 1 except that the firing temperature at the firing process was 970° C. Table 1 lists characteristics of the obtained nickel-manganese composite hydroxide. Table 2 lists characteristics and electrochemical characteristics evaluation results of the obtained positive electrode active material.

Comparative Example 3

A nickel-manganese composite hydroxide and a positive electrode active material were produced similarly to Example 1 except that the firing temperature at the firing process was 760° C. Table 1 lists characteristics of the obtained nickel-manganese composite hydroxide. Table 2 lists characteristics and electrochemical characteristics evaluation results of the obtained positive electrode active material.

TABLE 1

|  |  |  | Example 1 | Example 2 | Comparative Example 1 |
|---|---|---|---|---|---|
| Composite hydroxide | Composition (entire) | — | $Ni_{0.70}Co_{0.10}Mn_{0.20}(OH)_2$ | | |
|  | Thickness of manganese-rich layer | (%) | 7.8 | 6.2 | — |

TABLE 1-continued

|  |  |  |  | Example 1 | Example 2 | Comparative Example 1 |
|---|---|---|---|---|---|---|
| Production condition | First crystallization process | Average particle diameter Mv | (mm) | 10.8 | 10.3 | 11.4 |
|  |  | (D90-D10)/Mv | — | 0.87 | 0.94 | 1.00 |
|  |  | Tap density | (g/cm$^3$) | 2.00 | 2.12 | 2.25 |
|  |  | Crystallization temperature | (° C.) | 49 | 49 | 49 |
|  |  | pH | — | 12.3 | 12.3 | 12.0 |
|  |  | (First mixed aqueous solution) Ni:Co:Mn | — | 80:10:10 | 80:10:10 | 70:10:20 |
|  | Second crystallization process | Supply amount of second mixed aqueous solution | (L) | 15 | 10 | — |
|  |  | Crystallization temperature | (° C.) | 49 | 49 | — |
|  |  | pH | — | 11.2 | 11.2 | — |
|  |  | (Second mixed aqueous solution) Ni:Co:Mn | — | 50:10:40 | 40:10:50 | — |
|  |  | Mn/(Ni + Co) | — | 0.67 | 1 | — |

TABLE 2

|  |  |  | Example 1 | Example 2 | Example 3 | Comparative Example 1 | Comparative Example 2 | Comparative Example 3 |
|---|---|---|---|---|---|---|---|---|
| Production condition | Li/Me ratio | — | 1.03 | 1.03 | 1.03 | 1.03 | 1.03 | 1.03 |
|  | Firing temperature | (° C.) | 860 | 860 | 880 | 860 | 970 | 760 |
| Positive electrode active material | Composition | — | Li$_{1.03}$Ni$_{0.70}$Co$_{0.10}$Mn$_{0.20}$O$_2$ | | | Li$_{1.03}$Ni$_{0.70}$Co$_{0.10}$Mn$_{0.20}$O$_2$ | | |
|  | Eluted lithium | (%) | 0.12 | 0.11 | 0.09 | 0.08 | 0.06 | 0.26 |
|  | Degree of circularity | — | 0.961 | 0.958 | 0.956 | 0.933 | 0.912 | 0.959 |
|  | (003)-Plane crystallite diameter | (nm) | 166 | 178 | 182 | 237 | 223 | 53 |
|  | Average particle diameter Mv | (mm) | 10.46 | 10.54 | 11.21 | 15.27 | 15.60 | 9.9 |
|  | (D90-D10)/Mv | — | 0.83 | 0.92 | 0.93 | 0.97 | 1.02 | 0.98 |
|  | Positive electrode active material D50/composite hydroxide D50 | — | 0.97 | 1.05 | 1.12 | 1.34 | 1.38 | 0.98 |
|  | Specific surface area | (m$^2$/g) | 0.35 | 0.37 | 0.32 | 0.27 | 0.25 | 0.39 |
|  | Tap density | (g/cm$^3$) | 2.48 | 2.40 | 2.35 | 2.25 | 2.20 | 2.45 |
|  | Surface layer part/central part manganese concentration ratio | — | 1.03 | 1.08 | 0.99 | 1.01 | 0.98 | 2.45 |
| Battery characteristics | Initial charging capacity | (mAh/g) | 202.4 | 203.1 | 206.4 | 197.8 | 191.2 | 183.2 |
|  | Initial discharging capacity | (mAh/g) | 178.1 | 182.3 | 184.1 | 177.7 | 162.3 | 136.8 |
|  | Volume energy density | (Wh/L) | 1699 | 1620 | 1667 | 1527 | 1437 | 1231 |

(Evaluation Results)

The nickel-manganese composite hydroxides of the examples have the manganese-rich layer having an appropriate thickness at the outer circumferential part and are less likely to cause sintering among the secondary particles during the firing even when the firing temperature is relatively high, and the positive electrode active materials after the firing can achieve both high capacity and a reduction in the eluted lithium amount at a high level. The positive electrode active materials of the examples are high in the degree of circularity, involve less sintering among the secondary particles, are excellent in particle fillability, and obtain high volume energy density.

Comparative Example 1 is high in the firing temperature and can thus reduce the eluted Li to an extent comparable to those of the examples. However, the nickel-manganese composite hydroxide does not have the manganese-rich layer and is thus more likely to cause sintering among the secondary particles during the firing than the nickel-manganese composite hydroxides of the examples, and the positive electrode active material after the firing contains particles low in the specific surface area and low in the tap density. Consequently, it is lower in volume energy density than the examples.

The nickel-manganese composite hydroxide of Comparative Example 2 is extremely high in the firing temperature and thus causes sintering among the secondary particles to proceed during the firing compared with the nickel-manganese composite hydroxides of the examples, and the positive electrode active material after the firing contains particles low in the specific surface area and low in the tap density. Consequently, it is lower in volume energy density than the examples. In addition, the fixing temperature being extremely high disturbs atomic arrangement in the crystal, and it is lower in the initial charging/discharging capacity than the examples.

Comparative Example 3 provides low firing temperature, and does not cause the reaction with the Li compound during the firing to sufficiently proceed. This results in higher eluted lithium amount of the positive electrode active material after the firing and lower charging/discharging capacity than the examples.

From the foregoing, the manganese-rich layer with a specific thickness is formed on the surface of the nickel-manganese composite hydroxide, and the firing temperature is adjusted to the optimum value, whereby the positive electrode active material that inhibits sintering during the firing, is less in the eluted lithium amount, and can achieve both high capacity and high energy density can be obtained. When a paste is produced using the positive electrode active material of the present example, gelation can be inhibited.

The technical scope of the present invention is not limited to the aspects described in the embodiment and the like. One or more of the requirements described in the embodiment and the like may be omitted. The requirements described in the embodiment and the like can be combined as appropriate. Disclosure of Japanese Patent Application No. 2016-213413 and all the literature cited in this specification is herein incorporated by reference in their entirety to the extent allowed by law.

DESCRIPTION OF REFERENCE SIGNS

10 Nickel-manganese composite hydroxide
1 Secondary particle
2 Manganese-rich layer
3 Central part
r Radius of secondary particle
t Thickness of manganese-rich layer
PE Positive electrode (electrode for evaluation)
NE Negative electrode
SE Separator
GA Gasket
WW Wave washer
PC Positive electrode can
NC Negative electrode can

The invention claimed is:

1. A nickel-manganese composite hydroxide comprising a secondary particle formed of a plurality of mutually flocculated primary particles, wherein the nickel-manganese composite hydroxide is represented by General Formula (1): $Ni_{x1}Mn_{y1}M_{z1}(OH)_{2+\alpha}$ (in the formula (1), $0.70 \leq x1 \leq 0.95$, $0.05 \leq y1 \leq 0.30$, $x1+y1+z1=1.0$, and $0 \leq \alpha \leq 0.4$ are satisfied; and M is at least one element selected from Co, Al, Ti, V, Cr, Zr, Nb, Mo, Hf, Ta, Fe, and W), wherein
the nickel-manganese composite hydroxide comprises a central part of the secondary particle and a manganese-rich layer from a particle surface to a particle inner part of the secondary particle,
the manganese-rich layer is represented by General Formula (2) below, and a thickness of the manganese-rich layer is at least 5% and up to 20% of a radius of the secondary particle:

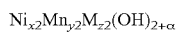   General Formula(2):

(in the formula (2), $x2+z2=0$ and $y2=1$ are satisfied or $y2/(x2+z2) \geq 0.6$ is satisfied; $0.35 \leq x2$ is satisfied; $0 \leq z2 \leq 0.40$, $x2+y2+z2=1.0$, and $0 \leq \alpha \leq 0.4$ are satisfied; and M is at least one element selected from Co, Al, Ti, V, Cr, Zr, Nb, Mo, Hf, Ta, Fe, and W),
wherein the manganese-rich layer is formed of one layer having a uniform composition, and
the nickel-manganese composite hydroxide has a [(D90−D10)/Mv] indicating a particle diameter variation index calculated from an accumulated 90 volume % diameter (D90), an accumulated 10 volume % diameter (D10), and the volume average particle diameter (Mv) of at least 0.60 in particle size distribution measured by laser diffraction scattering,
wherein the manganese-rich layer is formed from a particle surface to the central part of the secondary particle, and the central part of the secondary particle has a uniform composition.

2. The nickel-manganese composite hydroxide according to claim 1, the nickel-manganese composite hydroxide has a volume average particle diameter (Mv) of at least 4 μm and up to 20 μm.

3. The nickel-manganese composite hydroxide according to claim 1, the nickel-manganese composite hydroxide has a tap density of at least 1.8 g/cm³ and up to 3.2 g/cm³.

4. A method for producing the nickel-manganese composite hydroxide as claimed in claim 1, the method comprising:
generating particles of a nickel-manganese composite hydroxide by continuously supplying a first mixed aqueous solution containing at least a nickel salt and a manganese salt to a reaction aqueous solution to be subjected to neutralization crystallization using a reaction tank for continuous crystallization, and collecting the particles by overflowing slurry containing the particles from a reaction tank; and
forming the manganese-rich layer on surfaces of the particles by subjecting a reaction aqueous solution containing the collected particles and a second mixed aqueous solution having a molar ratio of Ni, Mn, and M similar to that in the manganese-rich layer to neutralization crystallization.

5. The method for producing the nickel-manganese composite hydroxide according to claim 4, wherein at the generating and the forming, an ammonia concentration of the reaction aqueous solution is adjusted to at least 5 g/L and up to 25 g/L.

6. The method for producing the nickel-manganese composite hydroxide according to claim 4, wherein at the generating and the forming, a temperature of the reaction aqueous solution is adjusted to a range of at least 35° C. and up to 60° C.

7. The method for producing the nickel-manganese composite hydroxide according to claim 4, wherein at the forming, a pH value measured with a liquid temperature of 25° C. as a basis of the reaction aqueous solution is adjusted to a range of at least 10.0 and up to 13.0.

8. A method for producing a positive electrode active material for a nonaqueous electrolyte secondary battery, the positive electrode active material comprising a lithium-nickel-manganese composite oxide represented by General Formula (3): $Li_{1+t}Ni_{x3}Mn_{y3}M_{z3}O_{2+\beta}$ (in the formula (3), $-0.05 \leq t \leq 0.5$, $0.70 \leq x3 \leq 0.95$, $0.05 \leq y3 \leq 0.30$, $x3+y3+z3=1.0$, and $0 \leq \beta \leq 0.5$ are satisfied; and M is at least one element selected from Co, Al, Ti, V, Cr, Zr, Nb, Mo, Hf, Ta, Fe, and W) and having a hexagonal layered structure, the method comprising:

mixing the nickel-manganese composite hydroxide according to claim 1 and a lithium compound together to form a lithium mixture; and firing the lithium mixture in an oxidative atmosphere at a temperature of at least 800° C. and up to 950° C. to obtain a lithium-nickel-manganese composite oxide in which the manganese in the manganese-rich layer is diffused.

9. The method for producing a positive electrode active material for a nonaqueous electrolyte secondary battery according to claim 8, wherein a value obtained by dividing an accumulated 50 volume % diameter (D50) of the lithium-nickel-manganese composite oxide after the firing by an accumulated 50 volume % diameter (D50) of the nickel-manganese composite hydroxide before the firing is up to 1.2 in particle size distribution measured by laser diffraction scattering.

10. The nickel-manganese composite hydroxide according to claim 1, wherein [(D90−D10)/Mv] is 0.7 or more.

11. The nickel-manganese composite hydroxide according to claim 1, wherein the thickness of the manganese-rich layer is at least 5% and less than 10% of a radius of the secondary particle.

* * * * *